(12) United States Patent
Matsumoto et al.

(10) Patent No.: US 6,293,770 B1
(45) Date of Patent: Sep. 25, 2001

(54) AUTOMOTIVE FUEL PUMP AND FILTER HOUSING

(75) Inventors: Kazuhiko Matsumoto, Saitama; Takashi Hashimoto; Taiki Aoyama, both of Kanagawa, all of (JP)

(73) Assignees: Calsonic Kansei Corporation, Saitama; Nissan Motor Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/138,669

(22) Filed: Aug. 24, 1998

(30) Foreign Application Priority Data

| Aug. 22, 1997 | (JP) | ................................. 9-226735 |
| Apr. 6, 1998 | (JP) | ................................. 10-093147 |
| Apr. 6, 1998 | (JP) | ................................. 10-093148 |

(51) Int. Cl.[7] .................. F04B 17/00; F04B 23/00
(52) U.S. Cl. ................... 417/361; 417/360; 417/313
(58) Field of Search ................... 417/313, 360, 417/361, 423.15

(56) References Cited

U.S. PATENT DOCUMENTS

| 4,212,600 | * | 7/1980 | Otto et al. ............... 417/360 |
| 4,305,416 | * | 12/1981 | Henning et al. ............ 137/38 |
| 4,309,155 | * | 1/1982 | Heinz et al. .............. 417/360 |
| 4,694,857 | * | 9/1987 | Harris .................... 137/565 |
| 4,747,388 | * | 5/1988 | Tuckey .................... 123/514 |
| 4,780,063 | * | 10/1988 | Tuckey .................... 417/360 |
| 4,974,570 | * | 12/1990 | Szwargulski ............... 123/509 |
| 5,140,303 | * | 8/1992 | Meyer ..................... 340/450.2 |
| 5,341,842 | * | 8/1994 | Chih et al. ............... 137/574 |
| 5,511,957 | * | 4/1996 | Tuckey et al. ............. 417/313 |

* cited by examiner

Primary Examiner—Timothy S. Thorpe
Assistant Examiner—Timothy P. Solak
(74) Attorney, Agent, or Firm—Sughrue, Mion, Zinn, Macpeak & Seas, PLLC

(57) ABSTRACT

A fuel tank cap body unit includes a fuel pump portion which is integrated with a fuel filter portion to form a filter-equipped pump. The filter-equipped pump is fixedly contained in a rotary tank having a flat base with which the base of the fuel tank is brought into contact. A fuel tank cap body through which a fuel discharge flow channel portion is passed, is provided. The fuel tank cap body includes a rotary-tank mounting wall, which can be made flexibly movable by a flexible mechanism, and can accommodate the rotary tank and the filter-equipped pump.

16 Claims, 20 Drawing Sheets

AUTOMOTIVE FUEL PUMP AND FILTER HOUSING

BACKGROUND OF THE INVENTION

1. Field of the Invention

The present invention relates to a fuel tank cap body unit which is fitted to a fuel tank for storing fuel to be supplied to mainly an internal combustion engine and equipped with a filter for filtering fuel supplied to the engine.

2. Description of the Related Art

Vehicles such as automobiles are generally mounted with fuel tanks for storing fuel for use in, for example, internal combustion engines and as disclosed in, for example, Japanese Patent Laid-Open No. 51564/1979, such a fuel tank is equipped with a fuel pump for sucking and feeding fuel to an engine and arranged so that the space between the suction port of the fuel pump and the base of the fuel tank is maintained at a predetermined value by mounting thin short leg portions in the axial position of the base of the fuel pump and disposing the fuel pump in such a way that the leg portions are brought into contact with the base of the fuel tank.

However, the aforesaid means for setting the space between the suction port of the fuel pump and the base of the fuel tank using the leg portions by mounting the thin short leg portions in the axial potions of the base of the fuel pump with the base of the fuel tank as a reference may cause the product quality of the fuel tank cap body unit to vary in a case where the base of the fuel tank is uneven or tilted because the leading ends of the leg portions are not brought into contact with the base of the fuel tank stably, thus differentiating the tank-to-tank contact condition, and the space between the suction port of the fuel pump and the base of the fuel tank using the leg portions cannot be maintained at the predetermined value.

Particularly when the recessed portion formed on the base of the fuel tank conforms to the leading end portion of the leg, the contact portion is unable to contact the base portion of the fuel tank and the problem is that the space between the suction port and the base of the fuel tank cannot be maintained at the predetermined value.

SUMMARY OF THE INVENTION

An object of the present invention intended to solve the foregoing problems is to provide a fuel tank cap body unit capable of holding a space necessary for the base of a fuel tank at a predetermined value.

In order to solve the above problems a fuel tank cap body unit according to the present invention is characterized in that: a fuel pump portion is integrated with a fuel filter portion to form a filter-equipped pump; the filter-equipped pump is fixedly contained in a rotary tank having a flat base with which the base of a fuel tank is brought into contact to integrate the rotary tank with the filter-equipped pump; a fuel tank cap body through which a fuel discharge flow channel portion is passed is provided; the fuel tank cap body is provided with a rotary-tank mounting wall which can be fitted to a combination of two component parts including the rotary tank and the filter-equipped pump; and the rotary-tank mounting wall provided for the rotary tank and fuel tank cap body is fitted in so that the rotary-tank mounting wall can be made flexibly movable via a flexible mechanism.

In the present invention, the base of the rotary tank of the fuel tank cap body unit is formed flat and the area of the base is wide. Therefore, the fuel tank cap body unit is easy to handle when it is conveyed and assembled as it can be held as a single unit body in an upright condition.

When the fuel tank cap body unit is inserted in the fuel tank, moreover, the flat base of the rotary tank is brought into contact with the base of the fuel tank and this results in causing the flexible mechanism to effect the shrinking movement of the rotary tank and the fuel tank cap body, so that the whole length of the fuel tank cap body unit is adjusted in harmony with the depth of the fuel tank. Thus, the fuel tank cap body unit can correspond to various fuel tanks even though the position of the recessed or stepped portion formed in the base of the fuel tank deviates from what is initially intended. Since the positional relation between the rotary tank and the filter-equipped pump is held constant, the filter-equipped pump is prevented from failing to suck fuel.

Furthermore, the fuel tank cap body unit can readily be assembled because the fuel tank cap body is mounted in such a state that the rotary tank and the filter-equipped pump have been integrated into a compact body.

The invention is further characterized in that the filter-equipped pump is constituted of the columnar fuel pump portion and the fuel filter portion is concentrically and integrally overlaid on the outer periphery of the fuel pump portion.

In the present invention, the filter-equipped pump can be made compact, in other words, it can be formed into a simple columnar body by disposing the filter portion on the outer periphery of the fuel pump portion. Moreover, high filter efficiency can be secured because a larger capacity is securable for the filter portion while the total height of the filter-equipped pump is kept smaller.

The invention is further in that: the flexible mechanism comprises a plurality of cylindrical guide portions provided in one of the rotary tank and the rotary-tank mounting wall of the fuel tank cap body, guide members each of which is formed on the other side of the rotary-tank mounting wall and can slidably be fitted in each cylindrical guide portion, and an elastic member installed between the cylindrical guide portion and the guide member; a flexible tube which can be coupled to the inner end portion of the fuel tank in a fuel discharge flow channel portion passed through the fuel tank cap body is connected to the outlet of the fuel filter portion of the filter-equipped pump; an opening for facilitating the coupling of the joint of the flexible tube to the inner end portion of the fuel tank in the fuel discharge flow channel portion is formed between the cylindrical guide portions of the rotary-tank mounting wall or the guide members provided for the fuel tank cap body.

In the present invention, the plurality of cylindrical guide portions is provided in one of the rotary tank and the rotary-tank mounting wall and the guide members each of which is formed on the other side thereof can slidably be fitted in each cylindrical guide portions, whereby the juxtaposition of the elastic material is facilitated and the flexible movement of the rotary tank and the fuel tank cap body is stably carried out. It is thus possible to secure a wider opening in between the cylindrical guide portion of the rotary-tank-mounting wall or the guide member. While the inside is visually inspected through the opening, the joint of the flexible tube and the inner end portion of the fuel discharge flow channel portion are coupled together to ensure that the coupling state of the piping system is maintained and that the fuel tank cap body unit can easily be assembled.

The invention is further in that: a level meter is mounted in one of the fuel tank cap body and the rotary tank.

In the invention constituted as claimed in claim 4 according to the present invention, the positional relation of the level meter to the base of the fuel tank is fixed constantly since the level meter is mounted in one of the fuel tank cap body and the rotary tank to ensure that the quantity of the liquid can be measured with accuracy.

In the present invention, a fuel tank cap body structure comprises integral fuel-supply-related equipment for sucking fuel in a fuel tank toward the inner side of a cap body disposed in the opening portion of the fuel tank and supplying the fuel outward is provided, in which the fuel tank cap body further comprises a flange mounted in the fuel tank and a fuel-supply-related equipment mounting wall which is integrally formed with the flange, the fuel-supply-related equipment mounting wall is formed in such a way as to surrounding a piping connecting portion passed through the flange; extending in the inward direction of the fuel tank from the flange; having a substantially circular shape in cross section in harmony with the opening of the fuel tank, the outer dimension of the wall thereof being slightly smaller than the inner diameter of the opening of the fuel tank, the fuel-supply-related equipment being disposed in the aforesaid circular shape, guide means is provided for guiding and connecting the fuel-supply-related equipment to the piping connecting portion by inserting the fuel-supply-related equipment along the fuel-supply-related equipment mounting wall in the direction of the flange, and retaining means for preventing the fuel-supply-related equipment from slipping off in such a state that the fuel-supply-related equipment has been connected to the piping connecting portion.

In the present invention, there is a fuel tank cap body structure in claim 5, in which a cutaway window is formed in a part of the fuel-supply-related mounting wall; and a gage mounting portion extending from the flange is formed in the cutaway window.

In the present invention, there is a fuel tank cap body structure in which the fuel-supply-related equipment is contained in a closed-end container; engaging means with which the front end of the fuel-supply-related mounting wall is engaged on the wall surface of the closed-end container; and a cutaway window is formed in the wall thereof.

In the present invention, there is a fuel tank cap body structure, in which a gage-connecting connector is disposed in such a way as to face the cutaway window.

In the present invention, there is a fuel tank cap body structure in which the cutaway window is closed when the gage is mounted in the cutaway window.

In the the present invention, there is a fuel tank cap body structure in which the rigidity of the flange side out of the fuel-supply-related equipment mounting wall is made stronger or otherwise the rigidity of the opposite side out of the fuel-supply-related mounting wall.

In the present invention, a fuel tank cap body structure in which the rigidity of the fuel-supply-related equipment mounting wall is increases; and an elastic engaging portion is provided on the periphery of the fuel-supply-related equipment.

DETAILED DESCRIPTION OF THE PREFERRED EMBODIMENTS

A description will subsequently be given of a specific mode 1–6 for carrying out the invention by reference to the drawings.

(Mode 1)

FIGS. 1–4 show a mode 1 for carrying out the invention.

Figure 4:
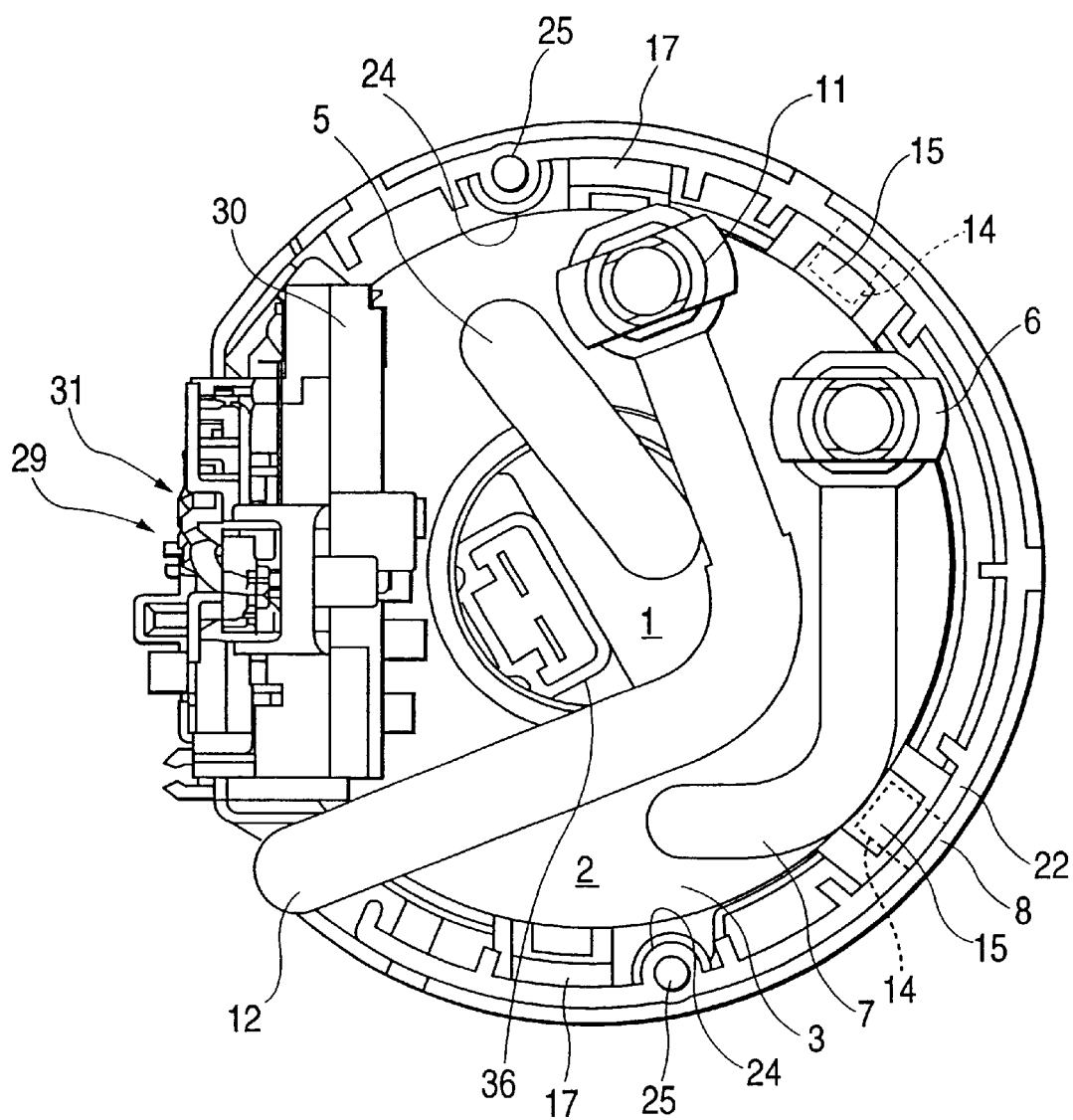
FIG. 4 is a sectional view taken on line B—B of FIG. 2.

In the mode 1 for carrying out the invention, a fuel pump portion 1 for sucking fuel and feeding the fuel thus sucked into an internal combustion engine, for example, and a fuel filter portion 2 for removing alien substances contained in the fuel are integrally formed as shown in FIG. 4 to constitute a filter-equipped pump 3, the pump being columnar in shape as a whole.

More specifically, the columnar filter-equipped pump 3 is constituted of the columnar fuel pump portion 1 and a fuel filter portion 2 which is concentrically and integrally overlaid on the outer periphery of the fuel pump portion 1. The fuel filter portion 2 is normally provided on the suction side of an engine and the use of the filter-equipped pump 3 makes it unnecessary to provide the engine with a fuel filter separately.

Furthermore, a disk-like suction-side filter 4 communicating with the suction port of the fuel pump portion 1 is fitted to the base of the filter-equipped pump 3. A flexible tube 5 is used for coupling the discharge port of the fuel pump portion 1 and the inlet of the fuel filter portion 2.

Moreover, another flexible tube 7 having a joint 6 at its front end is connected to the outlet of the fuel filter portion 2.

In addition, a rotary tank 8 is large enough to contain the filter-equipped pump 3, the rotary tank 8 being totally flat and thus capable of coming in contact with the base of the fuel tank and besides is in the form of a close-end cylinder. The rotary tank 8 is arranged so that it stores a predetermined quantity of fuel at all times to ensure that even when the fuel tank tilts, thus causing the fuel in the fuel tank to be offset, the fuel can be sucked and a fuel inlet 9 communicating with the fuel tank is provided at the base of the rotary tank 8. Furthermore, a nozzle 10 is disposed in the fuel inlet 9 and still another flexible tube 12 having a joint 11 at its front end is connected to the nozzle 10.

Recessed lines 14 projecting inward and extending in an axial direction 13 are formed and a backing member 15 for receiving and mating with the upper end portion of each recessed line 14 in a position corresponding to the side of the filter-equipped pump 3 is formed in order to constitute a stopper 16 for regulating the fitting position of the filter-equipped pump 3 with respect to the rotary tank 8. Incidentally, a buffer member 39 formed of elastic material such as rubber may be fitted to the contact portion with each backing member 15 of the filter-equipped pump 3 at the upper end of the recessed line 14 so as to prevent the pump 1 from vibrating. At this time, a predetermined space is formed between the rotary tank 8 and the base of the filter-equipped pump 3.

Furthermore, a retaining pawl 17 is formed in a plurality of peripheral places on the side of the filter-equipped pump 3 and a plurality of retaining holes 18 where the retaining pawls 17 are respectively retained are formed in corresponding positions of the rotary tank 8, so that the filter-equipped pump 3 can be secured to the rotary tank 8 integrally with a desired space left between their bases.

On the other hand, a fuel tank cap body 19 capable of closing a fuel tank opening is formed in the surface of the fuel tank. A fuel discharge flow channel portion 20 having a fuel tank inner end portion connectable to the joint 6 at the front end of the flexible tube connected to the outlet of the fuel filter portion 2, and a fuel return flow channel portion 21 having a fuel tank inner end portion connectable to the joint 11 at the front end of the flexible tube 12 connected to the nozzle 10 are passed through the fuel tank cap body 19. Furthermore, a cylindrical or partially cylindrical rotary-tank mounting wall 22 is so formed as to project in the axial direction 13 of the rotary tank 8 from the underside of the fuel tank cap body 19 (the inner portion of the fuel tank) in such a way as to surround the fuel discharge flow channel portion 20 and the fuel return flow channel portion 21. In this case, an interference preventive cutout 23 is formed in the rotary-tank mounting wall 22 in such a position as to correspond to the retaining pawls 17 of the filter-equipped pump 3. An opening 37 for use in facilitating the coupling of the joints 6, 11 to the fuel discharge flow channel portion 20 and the fuel-tank inner end portion of the fuel return flow channel portion 21 in the rotary-tank mounting wall 22 in the position between a cylindrical guide portion 24 or a guide member 25, which will be more fully described hereinafter. The opening 37 makes the rotary-tank mounting wall 22 partially cylindrical as stated above.

The rotary-tank mounting wall 22 formed on the underside of the fuel tank cap body 19 is arranged so that its inner diameter is equal to or slightly greater than the outer diameter of the filter-equipped pump 3 and its outer diameter is equal to or slight smaller than the inner diameter of the rotary tank 8, whereby the rotary-tank mounting wall 22 is insertable between the filter-equipped pump 3 and the rotary tank 8.

The cylindrical guide portion 24 extended in the axial direction 13 is formed in a plurality of peripheral positions in the rotary tank 8, and bar-like or cylindrical guide members 25 that can slidably be fitted in the respective cylindrical guide portions 24 are formed in positions corresponding to the side of the rotary-tank mounting wall 22. A flexible mechanism 38 is provided via an elastic member 26 such as a coil spring between the cylindrical guide portion 24 and the guide member 25 to make the rotary tank 8 and the fuel tank cap body 19 flexibly movable by means of the elastic force of the elastic member 26. In this case, the cylindrical guide portions 24 may be formed on the side of the rotary-tank mounting wall 22 and the guide members 25 may also be formed on the inner side of the rotary tank 8.

A retaining pawl 27 is formed in a plurality of peripheral places on the side of the rotary-tank mounting wall 22 and a plurality of retaining slot portions 28 for movably containing or retaining the retaining pawls 27 are formed in positions corresponding to the rotary tank 8, the retaining slot portions 28 extending in the axial direction 13.

Furthermore, a level meter 29 is fitted to the rotary tank 8 as the occasion demands. The level meter 29 comprises a fitting portion 30 with respect to the rotary tank 8, a detecting portion 31 including a variable resistor and the like, a float portion 32, and an arm portion 33 extended from the detecting portion 31 and connected to the float portion 32. The level meter is mounted before the filter-equipped pump 3 and the fuel tank cap body 19 are incorporated by fixedly inserting the fitting portion 30 in a fitting seat formed in the rotary tank 8. However, a temperature sensor 34 such as a thermistor may be provided additionally for the level meter 29. Incidentally, the opening 37 of the rotary-tank mounting wall 22 is situated in the same position as that of the level meter 29.

In the drawings, reference numeral 35 denotes a connector supplying power to the cap portion, and 36, a connector for supplying power to the pump portion, the connector 36 being provided for the filter-equipped pump 3.

Figure 1:
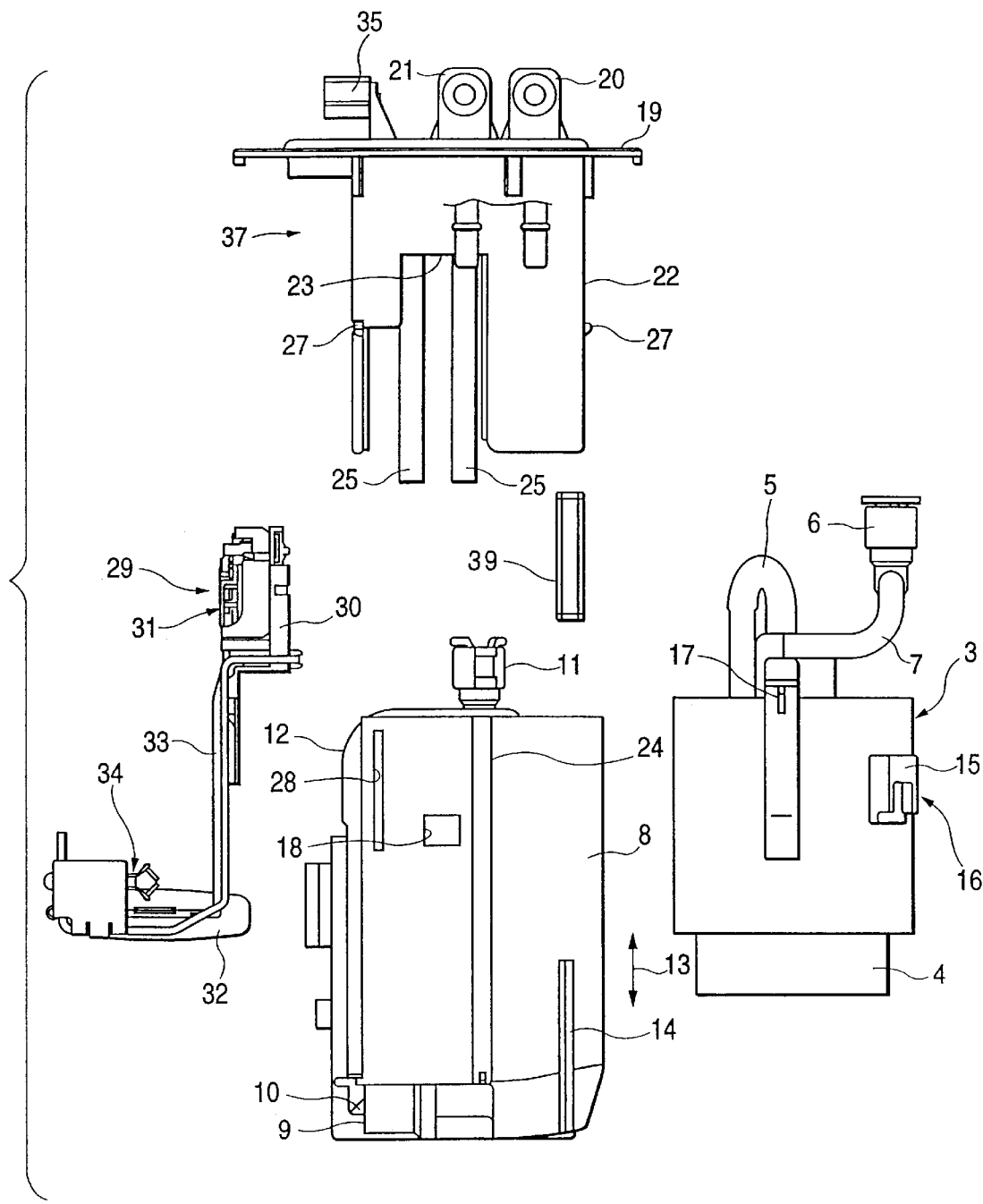
FIG. 1 is an exploded side view in a mode 1 for carrying out the invention.
Figure 2:
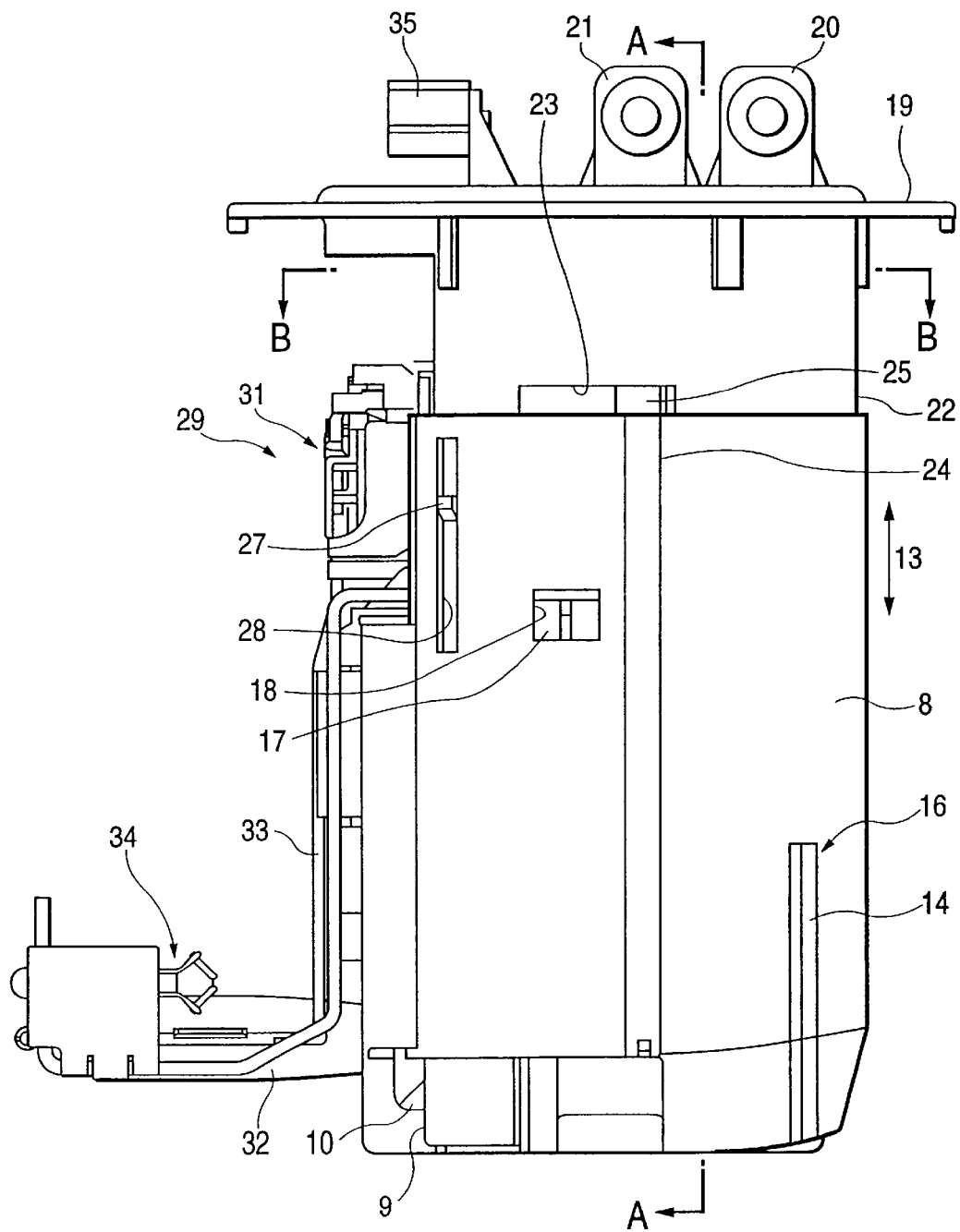
FIG. 2 is an assembly drawing of FIG. 1.

Referring to FIG. 1, there is described the operation in the mode 1 for carrying out the invention.

First a description will be given of a procedure for assembling a fuel tank cap body unit.

The filter-equipped pump 3 is contained in the rotary tank 8 whose base is totally flat in the form of a closed cylinder. At this time, the backing members 15 formed in the positions corresponding to the side of the filter-equipped pump 3 are supported with the upper ends of the respective recessed lines 14 projecting inside the rotary tank 8 and extending in the axial direction 13 and the retaining pawls 17 formed in the plurality of peripheral places on the side of the filter-equipped pump 3 are respectively retained in the plurality of retaining holes 18, whereby the suction port of the fuel pump portion 1 on the base of the filter-equipped pump 3 is integrated with the base of the rotary tank 8 while the space between both bases is held at predetermined value.

In this case, a buffer member formed of the elastic member 26 such as rubber may fitted to the portion with which each backing member 15 of the filter-equipped pump 3 is brought into contact in the recessed line 14 of the rotary tank 8, so that the filter-equipped pump 3 is elastically supported.

While the inside is visually inspected through the opening 37 formed in the rotary-tank mounting wall 22 or inspected with the hand put therethrough, the joint 6 at the front end of the flexible tube 7 connected to the outlet of the fuel filter portion 2 is coupled to the inner end portion of the fuel tank of the fuel discharge flow channel portion 20 passed through the fuel tank cap body 19, and the joint 11 at the front end of the flexible tube 12 connected to the nozzle 10 placed in the fuel inlet 9 of the rotary tank 8 is coupled to the inner end portion of the fuel tank of the fuel return flow channel portion 21 passed through the fuel tank cap body 19. Then, the electrical joint of the level meter 29 is connected to the connector 35 for supplying power to the cap body.

The rotary-tank mounting wall 22 on the underside of the fuel tank cap body 19 is inserted in between the filter-equipped pump 3 and the rotary tank 8 in that state.

At this time, the cylindrical guide portion 24 formed in the plurality of peripheral positions in the rotary tank 8 and extended in the axial direction 13 are juxtaposed with the elastic member 26 such as a coil spring, and the bar-like or cylindrical guide members 25 formed in the positions corresponding to the side of the rotary-tank mounting wall 22 are slidably fitted in to constitute the flexible mechanism 38, whereby the rotary tank 8 and the fuel tank cap body 19 are made flexibly movable by the urging force of the elastic member such as a coil spring.

Furthermore, the retaining pawls 27 formed in the plurality of peripheral places on the side of the rotary-tank mounting wall 22 are movably contained or retained in the plurality of retaining slot portions 28 formed in the positions corresponding to the rotary tank 8 and extending in the axial direction 13.

The rotary tank 8 of the fuel tank cap body unit thus assembled is inserted in the fuel tank opening so as to close the fuel tank opening with the fuel tank cap body 19 of the fuel tank cap body unit.

Since the rotary tank 8 and the fuel tank cap body 19 are flexibly movably fitted together by the urging force of the elastic member 26 such a coil spring, the flat base of the rotary tank 8 is totally brought into contact with the base of the fuel tank when the fuel tank cap body unit is inserted in the fuel tank, whereby the whole length of the fuel tank cap body unit is so adjusted as to conform to the depth of the fuel tank as the rotary tank 8 and the fuel tank cap body 19 are shrinkingly moved. In other words, even though a recessed portion smaller in contact area than that of the contact surface with the fuel tank is provided, the base of the rotary tank 8 is brought into contact with the plane formed around the recessed portion, so that the rotary tank 8 is made mountable without being affected by the recessed portion.

A description will subsequently be given of the flow of fuel in the fuel tank cap body unit thus assembled.

Figure 3:
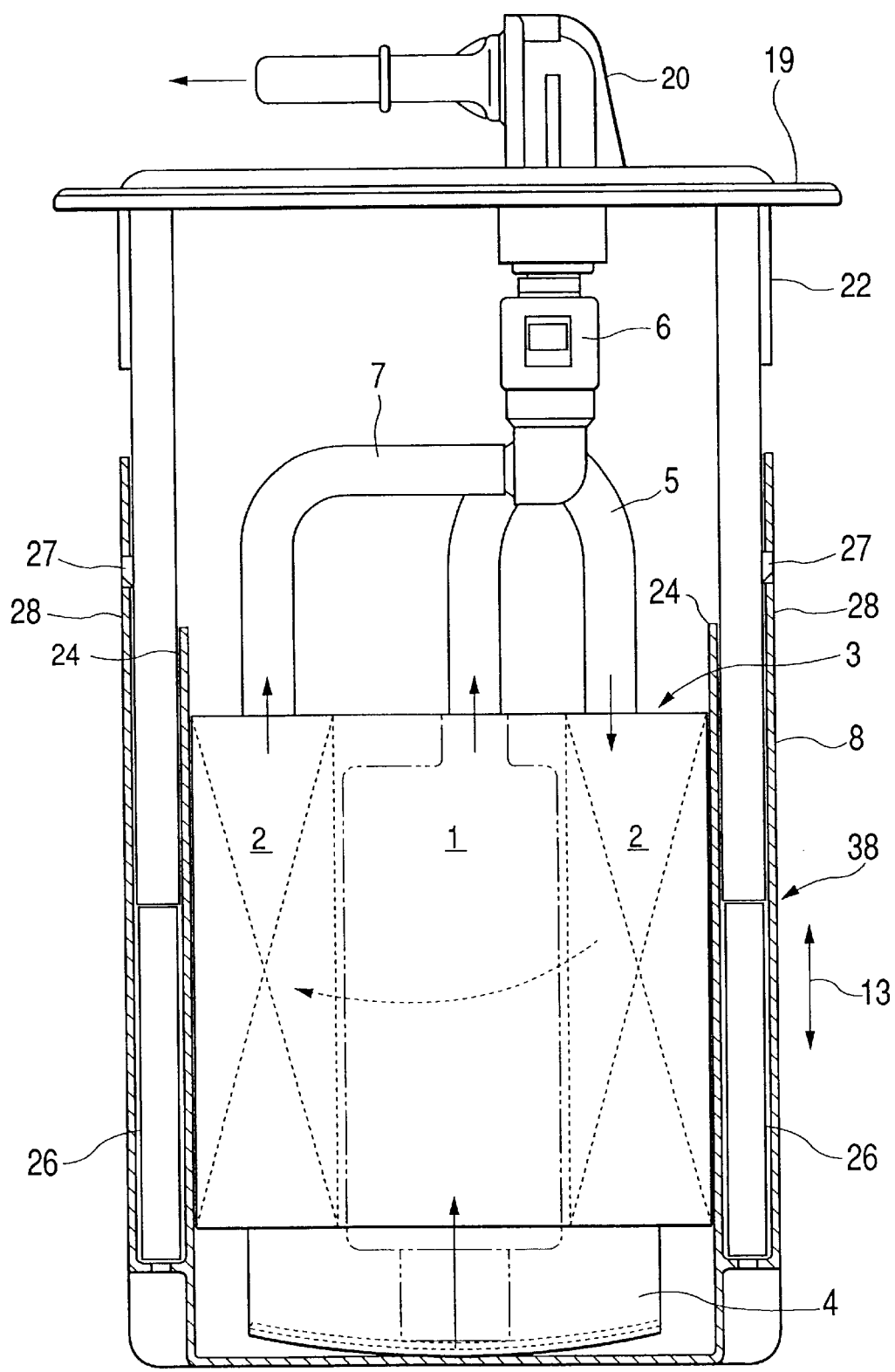
FIG. 3 is a sectional view taken on line A—A of FIG. 2.

As shown in FIG. 3, fuel in the rotary tank 8 is sucked through the disk-like suction-side filter 4 mounted on the suction side of the fuel pump portion 1 when the fuel pump portion 1 of the filter-equipped pump 3 is driven and relatively large alien substances mixed with the fuel are removed by the suction-side filter 4. The fuel discharged from the discharge portion of the fuel pump portion 1 is fed via the flexible tube 5 to the inlet of the fuel filter portion 2 provided on the outer periphery of the fuel pump portion 1, introduced from the inlet into the fuel filter portion 2, flows in the fuel filter portion 2 in such a way as to rotate around the outer periphery of the fuel pump portion 1, so that the alien substances contained in the fuel are removed by filtering. The fuel taken out of the fuel filter portion 2 is introduced into the fuel discharge flow channel portion 20 passed through the fuel tank cap body 19 via the flexible tube 7. Then the fuel is fed to, for example, an internal combustion engine from the fuel discharge flow channel portion 20 via a fuel hose (not shown).

On the other hand, surplus fuel from the engine is returned to the fuel return flow channel portion 21 passed through the fuel tank cap body 19 via a fuel return hose (not shown) and fed to the nozzle 10 disposed in the fuel inlet 9 of the base of the rotary tank 8 via the flexible tube 12 before being jetted from the nozzle 10 into the rotary tank 8. At this time, negative pressure is produced around the fuel inlet 9 in the base of rotary tank 8 by the fuel jetted out of the nozzle 10 and the fuel in the fuel tank is sucked by the negative pressure into the rotary tank 8.

The liquid level of the fuel in the fuel tank is measured by the level meter 29 mounted in the rotary tank 8. At this time, the base of the rotary tank 8 is brought into contact with the base of the fuel tank so that the rotary tank 8 is properly positioned as the level meter 29 is mounted in the rotary tank 8, whereupon the liquid level of the fuel can be measured with excellent accuracy.

As set forth above, according to the present invention, the fuel tank cap body unit can be held as a single unit body in an upright condition since the base of the rotary tank 8 forming the base of the fuel tank cap body unit is totally made planar and easy to assemble and handle in view of production. Moreover, the present invention demonstrates the effect of making it easy to contain the fuel tank cap body unit in a box or the like. Since the rotary tank 8 which has the flat base capable of contacting the base of the fuel tank and is capable of fixedly containing the filter-equipped pump 3 and the rotary-tank mounting wall 22 are fitted together so that they are flexibly movable via the flexible mechanism 38 equipped with the elastic member 26 such a coil spring, the rotary tank 8 and fuel tank cap body 19 are shrinkingly moved when the flat base of the rotary tank 8 is brought into contact with the base of the fuel tank at the time the fuel tank cap body unit is inserted in the fuel tank, whereby the whole length of the fuel tank cap body unit is adjusted to the depth of the fuel tank.

In consequence, even though the recessed portion smaller in contact area than that of the contact surface with the fuel tank is provided in the contact surface, the base of the rotary tank 8 is brought into contact with the plane formed around the recessed portion, so that the rotary tank 8 is made mountable without being affected by the recessed portion and the positional relation between the rotary tank 8 and the filter-equipped pump 3 is held constant. Therefore, the suction of the fuel by means of the filter-equipped pump 3 can be prevented from being impeded and this makes it possible to measure the liquid level of fuel with higher accuracy.

As the fuel tank cap body 19 is mounted in such a state that the rotary tank 8 has been integrated with the filter-equipped pump 3, assembly work is facilitated.

In addition, mounting the level meter 29 in the rotary tank 8 allows the level meter 29 to be properly positioned when the base of the rotary tank 8 is brought into contact with the base of the fuel tank and consequently the liquid level of fuel can be measured with excellent accuracy.

Since the filter-equipped pump 3 is made integral with the fuel pump portion 1 by concentrically and integrally overlaying the cylindrical fuel filter portion 2 on the outer periphery of the fuel pump portion 1 then, the filter-equipped pump 3 can be formed into a simple columnar body. Moreover, disposing the fuel filter portion 2 on the outer periphery of the fuel pump portion 1 makes it possible to provide a larger capacity for the fuel filter portion 2 while lowering the whole height of the filter-equipped pump 3, which results in securing high filter efficiency.

Furthermore, the plurality of the cylindrical guide portions 24 are formed on one of the rotary tank 8 and the rotary-tank mounting wall 22 of the fuel tank cap body 19, and the guide members 25 that can slidably be fitted in the respective cylindrical guide portions 24 on the other, whereby the juxtaposition of the elastic member 26 can be facilitated and the flexible movement of the rotary tank 8 and the fuel tank cap body 19 can also be stabilized. It is thus possible to secure a wider opening 37 in between the cylindrical guide portion 24 of the rotary-tank mounting wall 22 or the guide member 25. While a visual inspection is made through the opening 37, the joint 6 at the front end of the flexible tube 7 connected to the outlet of the fuel filter portion 2 can be coupled to the inner end portion of the fuel tank of the fuel discharge flow channel portion 20 passed through the fuel tank cap body 19, and the joint 11 at the front end of the flexible tube 12 connected to the nozzle 10 disposed in fuel inlet 9 of the rotary tank 8 can also be coupled to the inner end portion of the fuel tank of the fuel return flow channel portion 21 passed through the fuel tank cap body 19. Consequently, the assembly of the fuel tank cap body unit is facilitated while the coupling of these piping systems is kept ensured.

Although the level meter 29 has been fitted to the fitting seat of the rotary tank 8 in the mode 1 for carrying out the invention, it may be fitted to the base of the rotary-tank mounting wall 22.

(Mode 2)

FIGS. 5–9 show a mode 2 for carrying out the invention, in which like reference characters designate like and equivalent component parts in the aforesaid prior art examples.

Figure 5:
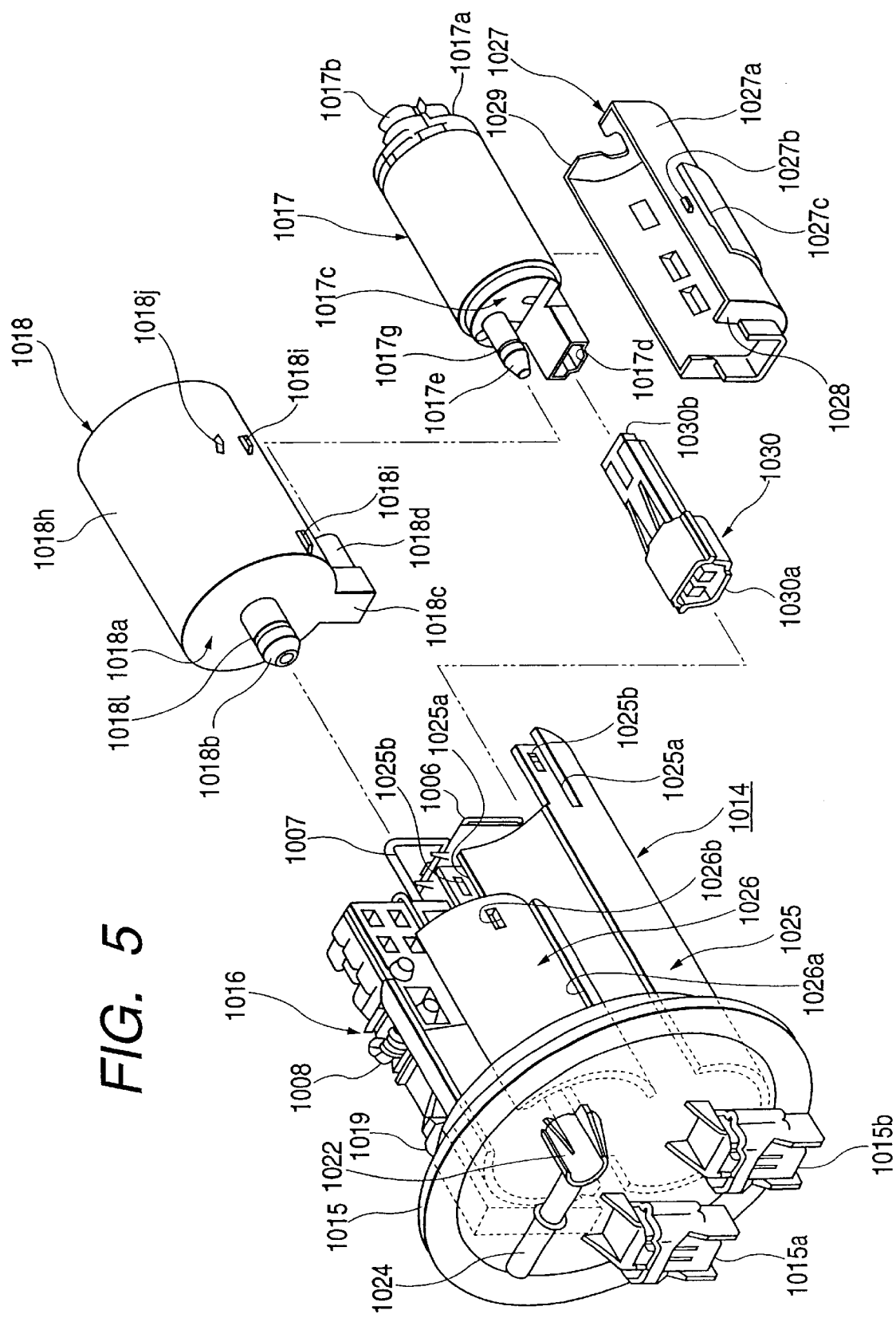
FIG. 5 is an exploded perspective view explanatory of the total structure of a fuel tank cap body.
Figure 6:
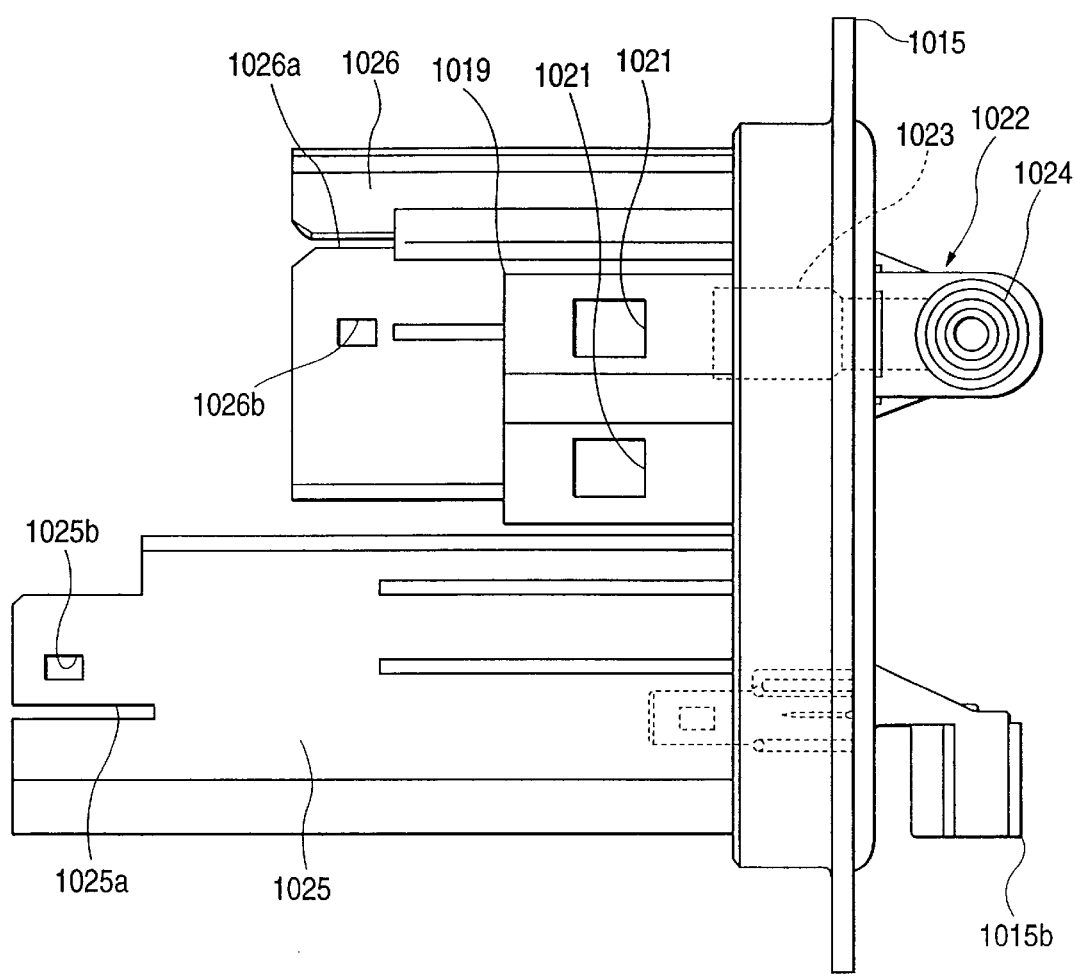
FIG. 6 is a side view of the fuel tank cap body in a mode 2 for carrying out the invention.
Figure 7:
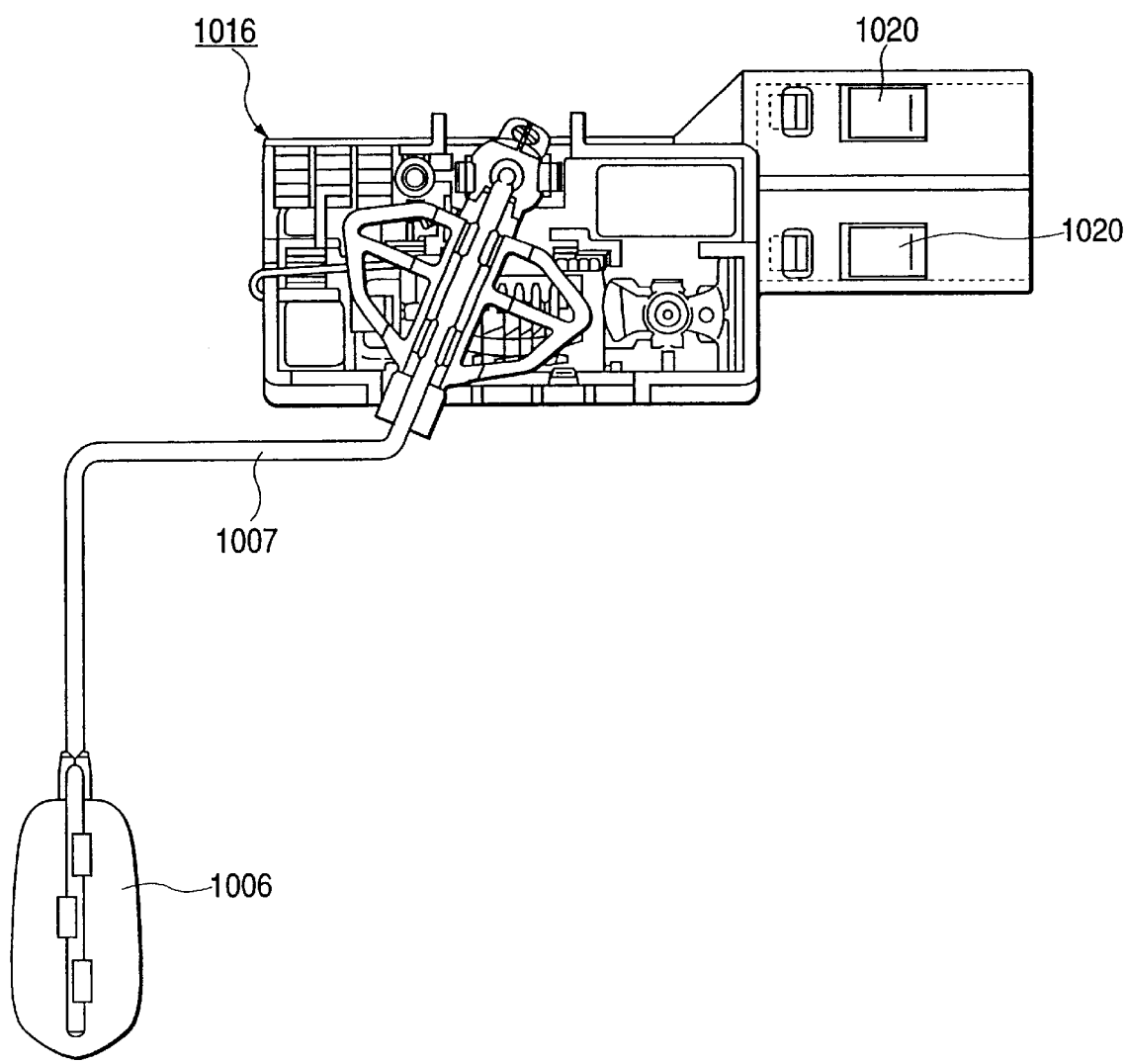
FIG. 7 is a side view of a potentiometer unit in the fuel tank cap body in the mode 2 for carrying out the invention.

A description will be given of the structure of a cap first. In FIG. 5, reference numeral 1014 denotes a closed cap which is fitted in the opening of a fuel tank in this mode for carrying out the invention, the closed cap 1014 principally comprising a substantially disk-shaped cap body 1015, a potentiometer unit 1016 having a potentiometer which is integrally provided on the inner side of the cap body 1015 and used for detecting the quantity of residual fuel, a fuel pump 1017 which is substantially columnar in cross section and used for sucking the fuel in the fuel tank and supplying the fuel outside, and a fuel filter 1018 which is substantially columnar in cross section and used for filtering the fuel thus sucked.

Figure 8:
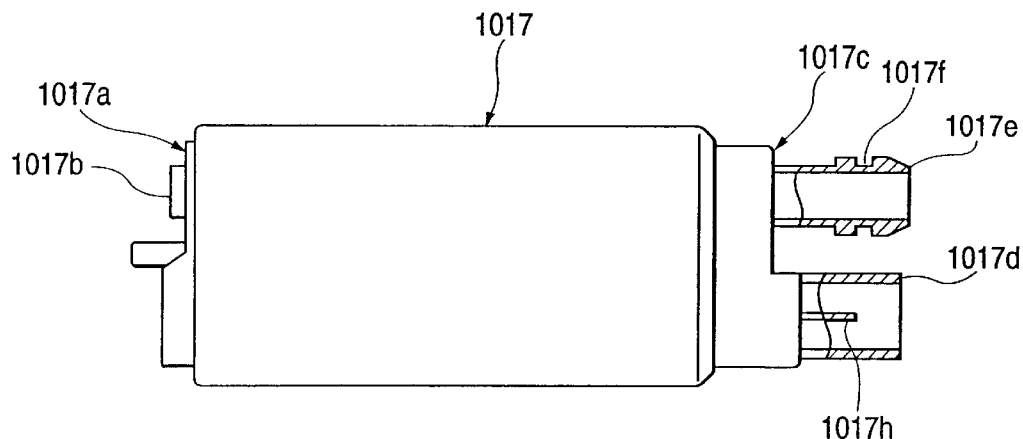
FIG. 8 is a partial sectional side view of the fuel pump in the fuel tank cap body in the mode 2 for carrying out the invention.

As shown in FIG. 8, furthermore, the fuel pump 1017 is equipped with a fuel suction port 1017b in its underside portion 1017a, a connector portion 1017d for receiving driving electric power in the top surface portion 1017c, and a projected fuel outlet portion 1017e for jetting out the fuel thus sucked. An annular ring groove 1017f which is furnished with a rubber seal ring 1017g is also formed in the peripheral face of the projected fuel outlet portion 1017e.

Figure 9:
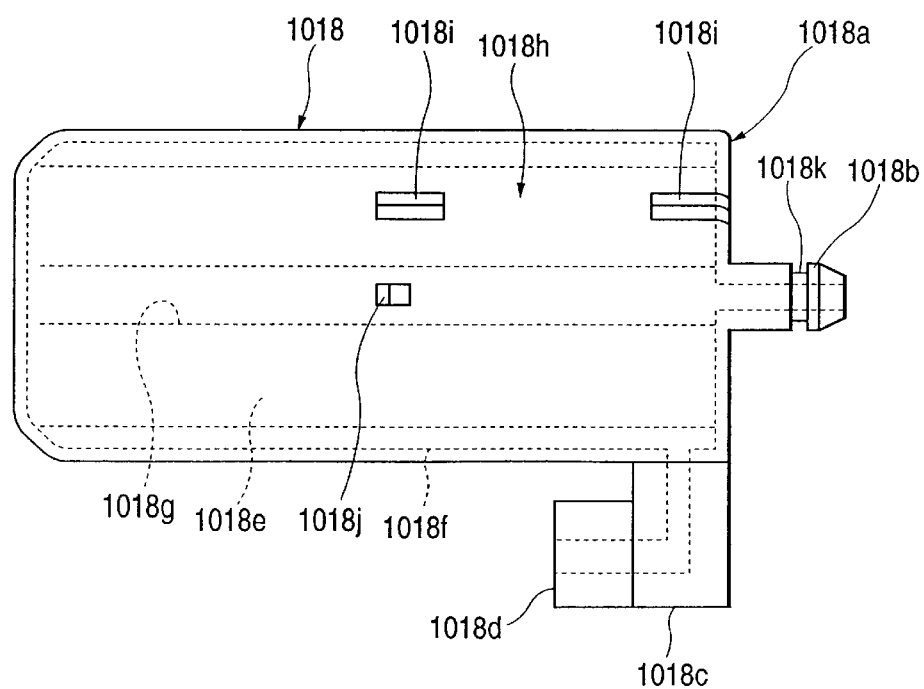
FIG. 9 is a side view of the fuel filter in the fuel tank cap body in a mode 3 for carrying out the invention.

As shown in FIG. 9, furthermore, the fuel filter 1018 is equipped with a projected outlet portion 1018b substantially in the central portion of the surface portion 1018a, and a pump-connect opening portion 1018d in the peripheral end edge 1018c of the surface portion 1018a, the pump-connect opening portion 1018d forming an opening directed downward so as to receive the projected fuel outlet portion 1017e along the direction of a pipe shaft. Thus, the fuel pump 1017 and the fuel filter 1018 are integrated to form a fuel-supply-related mechanism.

The fuel made to flow in via the pump-connect opening portion 1018d penetrating from an outer peripheral face 1018f into a filter body 1018e disposed in a substantially cylindrical form within the fuel filter 1018 is filtered thereby, gathered via the inner peripheral face 1018g substantially in the center before being jetted out of the projected outlet portion 1018b. The projected outlet portion 1018b is formed with a ring groove 1018k for use in disposing a sealing 1018l.

Guide projections 1018i and retaining pawls 1018j are projected from the side portion 1018h of the fuel filter 1018.

A potentiometer mounting wall 1019 extending substantially perpendicularly from the cap body 1015 in the inner side direction of the fuel tank is formed integrally with the cap body 1015.

In this potentiometer mounting wall 1019, mating holes 1021, 1021 for use in securing the potentiometer unit 1016 to the cap body 1015 by engaging with mating pawls 1020, 1020 projecting from the potentiometer unit 1016 are bored in a direction substantially perpendicular to the direction of extending the wall surface.

A connector portion 1015a is formed integrally with the cap body 1015 in an outer position corresponding to the potentiometer mounting wall 1019. A connector portion 1015b for supplying electric power to the fuel pump 1017 is also formed integrally with the cap body 1015 in a position adjacent to the connector portion 1015a.

Furthermore, a pump piping joint 1022 is formed integrally with and passed through the cap body 1015. This pump piping joint 1022 is equipped with a pump fit-in portion 1023 where the projected outlet portion 1018b of the fuel filter 1018 is fitted in, and a piping joint 1024 where the fuel caused to flow in from the pump fit-in portion 1023 is led in the direction of an engine by connecting the leading end of the piping joint 1024 to a fuel pipe arrangement (not shown).

A fuel-pump mounting wall 1025 is formed around the pump piping joint 1022 of the cap body 1015 so that it is integral with the cap body 1015.

This fuel-pump mounting wall 1025 is extended in a direction substantially perpendicular to the inner direction of the fuel tank from the cap body 1015 and substantially arcuate in cross section in harmony with the outer shape of the fuel pump 1017.

A fuel-filter mounting wall 1026 is formed integrally with the cap body 1015 in a manner substantially centering on the pump piping joint 1022.

The fuel-filter mounting wall 1026 is extended from the cap body 1015 in a direction substantially perpendicular to the inner direction of the fuel tank in a position adjacent to the position where the fuel-pump mounting wall 1025 is formed and substantially arcuate in cross section in harmony with the outer shape of the fuel filter 1018.

Moreover, a filter slit 1026a as a filter guide means is formed in the fuel-filter mounting wall 1026.

By inserting the fuel filter 1018 into the filter slit 1026a in the direction of the cap body 1015, the projected outlet portion 1018b of the fuel filter 1018 is joined to the pump piping joint 1022 and when the fuel pump 1017 is mounted, the guide projections 1018i are capable of sliding to guide the pump-connect opening portion 1018d so that the pump-connect opening portion 1018d as an inlet portion connected to the projected fuel outlet portion 1017e is placed in a position corresponding to the projected fuel outlet portion 1017e.

Furthermore, retaining holes 1026b as filter retaining means for retaining the retaining pawls 1018j and preventing the fuel filter 1018 from slipping off in such a state the fuel filter 1018 is kept in engagement with the pump piping joint 1022 are bored in a direction substantially perpendicular to the wall surface of the fuel-filter mounting wall 1026.

Moreover, the fuel-pump mounting wall 1025 has pump slits 1025a as pump guide means for guiding the fuel pump 1017 in order to connect the fuel pump 1017 via the fuel filter 1018 to the pump piping joint 1022 when the fuel pump 1017 is inserted along the fuel-pump mounting wall 1025 in the direction of the cap body 1015.

Furthermore, retaining holes 1025b as pump retaining means for preventing the fuel pump 1017 from slipping off in such a state the fuel pump 1017 is kept in engagement with the pump piping joint 1022 via the fuel filter 1018 are bored in a direction substantially perpendicular to the direction of extending the wall surface of the fuel-pump mounting wall 1015.

A plastic pump holder 1027 is mounted on the fuel pump 1017 in such a manner that the pump holder 1027 is fitted in from the peripheral side of the fuel pump 1017. The pump holder 1027 is in a substantially semicircular form 1027a in cross section and by forming an upper and a lower wall 1028, 1029 respectively at the upper and lower ends of the pump holder 1027, the underside and top surface portions 1017a, 1017c of the fuel pump 1017 are brought into contact therewith and held thereby in order to prevent the fuel pump 1017 from slipping off.

Retaining pawls 1027b for engaging with the respective retaining holes 1025b as the pump retaining means are bored in the outer side 1027a of the pump holder 1027.

Guide pieces 1027c capable of sliding in the respective pump slits 1025a are projected from the outer side 1027a of the pump holder 1027.

Furthermore, a relay connector 1030 for connecting both connector portions 1015b, 1017d is provided between the connector portion 1015b of the cap body 1015 and the connector portion 1017d of the fuel pump 1017. One end portion 1030a of the relay connector 1030 is fitted in the tank of the connector portion 1015b and the other end 1030b is fitted in the connector portion 1017d.

The functions in the mode 2 for carrying out the invention will subsequently be described.

First, the potentiometer unit 1016 is mounted in the cap body 1015.

When the potentiometer unit 1016 is inserted along the potentiometer mounting wall 1019 extended in the direction substantially perpendicular to the cap body 1015, the mating pawls 1020, 1020 projecting from the potentiometer unit 1016 are brought into engagement with the mating holes 1021, 1021 formed in the potentiometer mounting wall 1019 and the potentiometer unit 1016 is secured to the cap body 1015.

In order to mount the fuel filter 1018, the fuel filter 1018 is slidingly inserted into the filter slits 1026a formed in the fuel-filter mounting wall 1026 by sliding the guide projections 1018i of the fuel filter 1018, whereupon the side portion 1018h of the fuel filter 1018 is slidingly moved in the direction of extending the fuel-filter mounting wall 1026.

The fuel-filter mounting wall 1026 is extended from the cap body 1015 in the direction substantially perpendicular to the inner direction of the fuel tank 1001 in the position adjacent to the position where the fuel-pump mounting wall 1025 is formed and substantially arcuate in cross section in harmony with the outer shape of the fuel filter 1018.

Consequently, the fuel filter 1018 whose side portion 1018h is made of plastics is smoothly and slidingly moved along the plastic fuel-pump mounting wall 1025.

With the sliding movement of the fuel filter 1018 as a guide, the filter slits 1026a cause the projected outlet portion 1017e of the fuel filter 1018 to be inserted into and connected to the pump fit-in portion 1023 formed in the pump piping joint 1022. Thus, the seal ring 1017g is used to seal between the pump fit-in portion 1023 and the projected outlet portion 1017e.

Since the filter slits 1026a are formed in the direction of extending the fuel-filter mounting wall 1026, the fuel-filter mounting wall 1026 is reducible to small pieces and bent in the diameter-expansion direction and easy to expand outward though it is substantially arcuate in cross section. Consequently, even though the retaining pawls 1018j are projected from the side portion 1018h of the fuel filter 1018, the fuel-filter mounting wall 1026 expands outward in the portion where the retaining pawls 1018j are brought into contact therewith, thereby its insertion is never impeded.

When the retaining pawls 1018j reach the position where the retaining holes 1026b are formed, furthermore, the retaining pawls 1018j are inserted into the retaining holes 1026b and the bending of the fuel-filter mounting wall 1026 is decreased inward in the diametrical direction so as to restore the original condition. Consequently, the retaining pawls 1018j are retained by the peripheral edges of the respective retaining holes 1026b and the fuel filter 1018 is stopped from slipping off in such a state that the fuel filter 1018 has been joined to the pump piping joint 1022.

At this time, the plastic fuel-filter mounting wall 1026 is brought into intimate contact with the fuel filter 1018 having the side portion 1018h. Since the fuel-filter mounting wall 1026 is arcuate in cross section in harmony with the shape of the fuel filter 1018, a backlash is minimized to ensure that the fuel filter 1018 is mounted with stability.

Moreover, the provision of the filter slits 1026a for guiding the fuel filter 1018 stops the fuel filter 1018 from moving in the rotational direction with its projected outlet portion 1018b substantially as the central axis and when the fuel pump 1017 is mounted, the pump-connect opening portion 1018d connected to the projected outlet portion 1017e is situated in the position corresponding to the projected outlet portion 1017e.

When the fuel pump 1017 together with the fuel filter 1018 is subsequently inserted in the same direction, the mounting of the fuel filter 1018 is completed with the effect of facilitating the assembly work.

Although the height of the fuel filter 1018 is selected to have a predetermined value, the height ranging from the cap body 1015 up to the fuel filter 1018 or the underside portion 1017a of the fuel pump 1017 can be suppressed since the fuel filter 1018 is so disposed as to adjoin the fuel pump 1017.

It is preferable to use the cap body 1015 for the fuel tank 1001 whose inner height is restricted.

The filter slits 1026a are readily formable when these slits are molded by directing the die cutting direction along the fuel-filter mounting wall 1026. Furthermore, the retaining holes 1026b are also readily bored as these holes are formed along the direction substantially perpendicular to the direction of extending the fuel-filter mounting wall 1026.

Subsequently, as shown in FIG. 5, the fuel pump 1017 is fitted in the pump holder 1027 sideways and the other end portion 1030b of the relay connector 1030 is simultaneously fitted in the connector portion 1017d. The pump holder 1027 is prevented from slipping off in the vertical direction because it has the upper and lower wall portions 1028, 1029.

Then the fuel pump 1017 equipped with the pump holder 1027 and the like is inserted along the direction of the cap body 1015 along the fuel-pump mounting wall 1025 extended in the direction substantially perpendicular to the cap body 1015.

When the fuel pump 1017 is thus inserted, the outer wall surface of the pump holder 1027 is smoothly inserted along the inner wall of the fuel-pump mounting wall 1025 since the fuel-pump mounting wall 1025 is substantially arcuate in cross section in harmony with the outer shape of the pump holder 1027 of the fuel pump 1017.

The guide pieces 1027c are guided by the pump slits 1025a so that the projected outlet portion 1017e of the fuel pump 1017 is connected to the pump-connect opening portion 1018d communicating with the pump piping joint 1022 and prevented from pivoting with the direction of insertion as an axis, whereupon the projected outlet portion 1017e of the fuel pump 1017 is inserted and connected thereto and sealed by the seal ring 1018l. Simultaneously, one end portion 1030a of the relay connector 1030 is inserted and fitted to the connector 1015b of the cap body 1015 to establish electrical conduction.

Since pump slits 1025a are formed along the direction of extending the fuel-pump mounting wall 1025 at this time, the fuel-pump mounting wall 1025 is reducible to small pieces and bent in the diameter-expansion direction and easy to expand outward though it is substantially arcuate in cross section. Consequently, even though the retaining pawls 1027b are projected from the outer side 1027a of the pump holder 1027, the fuel-filter mounting wall 1025 expands outward in the portion where the retaining pawls 1027b are brought into contact therewith, thereby its insertion is never impeded.

When the retaining pawls 1027b reach the position where the retaining holes 1025b are formed, the retaining pawls 1027b are inserted into the retaining holes 1025b and the bending of the fuel-filter mounting wall 1026 is decreased inward in the diametrical direction so as to restore the original condition. Consequently, the retaining pawls 1027b are retained by the peripheral edges of the respective retaining holes 1025b and the fuel filter 1018 is stopped from slipping off in such a state that the projected outlet portion 1017e of the fuel pump 1017 has been joined to the pump-connect opening portion 1018d.

At this time, the plastic fuel-pump mounting wall 1025 is brought into intimate contact with the pump holder 1027 having the outer side 1027a. Since the fuel-filter mounting wall 1025 is arcuate in cross section in harmony with the shape of the pump holder 1027, a backlash is minimized to ensure that the fuel filter 1018 is mounted with stability.

In the thus connected state, the pump holder 1027 is prevented from slipping off as the retaining pawls 1027b are retained in the respective retaining holes 1025b, whereby the fuel pump 1017 is completed mounted in the cap body 1015.

Therefore, the potentiometer unit 1016, the fuel pump 1017 and the fuel filter 1018 are integrally mounted in the cap body 1015 without using brackets and the like as before in order to form the closed cap 1014, so that the number of fitting parts such as brackets, bolts, nuts and so on becomes reducible.

Moreover, not only assembling the fuel pump 1017 and the like but also from piping the pump up to electrical connections made by means of the relay connector 1030 can be completed only by inserting the potentiometer unit 1016, the fuel pump 1017 and the fuel filter 1018 in the cap body 1015 from one direction along the mounting walls 1019, 1025, 1026. Hence, the number of manufacturing steps can be reduced and simultaneously assembly workability can be also improved.

In the mode 2 for carrying out the invention, the retaining holes 1026b of the fuel filter 1018 are used to retain the retaining pawls 1018j and simultaneously the pump-connect opening portion 1018d is connected to the projected fuel outlet portion 1017e of fuel pump 1017, whereby the projected fuel outlet portion 1017e is supported so that it is prevented from moving in the direction in which the fuel-filter mounting wall 1026 is extended.

Consequently, only by inserting the fuel filter 1018 and then the fuel pump 1017 in the cap body 1015 in this order, the fuel filter 1018 is stopped from slipping off by the retaining pawls 1018j and in a plurality of places of the pump-connect opening portion 1018d. Therefore, the fuel filter 1018 can be secured stably to the cap body 1015 and assembly workability can also be improved.

Since the potentiometer mounting wall 1019, the fuel-pump mounting wall 1025 and the fuel-filter mounting wall 1026 are formed in the direction substantially perpendicular to the potentiometer unit 1016, an increase in manufacturing cost can be suppressed by adopting an easy-to-part structure at the time of molding.

Since the potentiometer mounting wall 1019, the fuel-pump mounting wall 1025 and fuel-filter mounting wall 1026 are made of plastic material, the fuel-pump mounting wall 1025 and the like are bent and expanded outward when the fuel pump 1017 and the like are inserted with effect of reducing resistance and after they are mounted, the inner face of the fuel-pump mounting wall 1025 and the like are tightly joined and secured to the outer peripheral face of the pump holder 1027 of the fuel pump 1017.

In consequence, a stable mounted state can be held while mounting workability is made improvable further.

The pump slits 1025a are readily formable when these slits are molded by directing the die cutting direction along the fuel-pump mounting wall 1025.

Since the pump slits 1025a are formed along the direction of extending the fuel-pump mounting wall 1025, moreover, the fuel-pump mounting wall 1025 is divided in the circumferential direction so that even though the fuel-pump mounting wall 1025 is substantially arcuate, it is reduced to small pieces by the pump slits 1025a up to substantially plate-like size which is hardly affected by the substantially arcuate shape in cross section, and bent in the diameter-expansion direction and easy to expand outward. Consequently, mounting workability is made improvable further.

The retaining holes 1025b for use in retaining the retaining pawls 1027b, which retaining holes 1025b are bored in the direction substantially perpendicular to the direction in which the wall surface of the fuel-pump mounting wall 1025 is extended, are formed in the fuel-pump mounting wall 1025.

Therefore, the retaining holes 1025b are readily bored and formed at the time of forming them.

By forming the retaining pawls 1027b in the pump holder 1027 instead of forming the retaining pawls 1027b in the fuel pump 1017, the pump holder 1027 is mounted in the fuel pump 1017, inserted along the fuel-pump mounting wall 1025 and slidingly moved for assembling purposes. Consequently, the pump holder 1027 can be mounted with stability even though the outer peripheral face of the fuel pump 1017 is made of metal and difficult to machine.

Since the pump holder 1027 is made of plastic material, moreover, the pump holder 1027 is further smoothly insertable into the fuel-pump mounting wall 1025 also made of the plastic material and after the pump holder 1027 is thus mounted, the pump holder 1027 can stably be secured to the fuel-pump mounting wall 1025 by decreasing the gap.

In this mode 2 for carrying out the invention, the fuel filter 1018 integrally mounted in the cap body 1015 is placed between the pump piping joint 1022 and the fuel pump 1017.

Consequently, the fuel filter 1018 is integrally mounted in the cap body 1015 and the fuel pump 1017 is mounted. Then the fuel sucked from the fuel suction port is supplied via the projected outlet portion 1017e to the fuel filter 1018 and filtered from the outer wall surface 1018f side toward the inner wall surface 1018g side of the filter body 1018e in the fuel filter 1018. Furthermore, a meandering fuel flow channel communicating with the pump piping joint 1022 connected to the fuel piping is formed from the projected outlet portion 1018b so as to complete the assembly work.

In the fuel filter 1018, the fuel is filtered from the outer wall surface 1018f side toward the inner wall surface 1018g side of the filter body 1018e as shown in FIG. 9.

While a sufficient area of the filter body 1018e of the fuel filter 1018 is secured, an increase in the height to the bottom of the fuel filter 1018 is suppressed, so that the fuel filter 1018 is integrally mounted in the cap body 1015.

(Mode 3)

Figure 10:
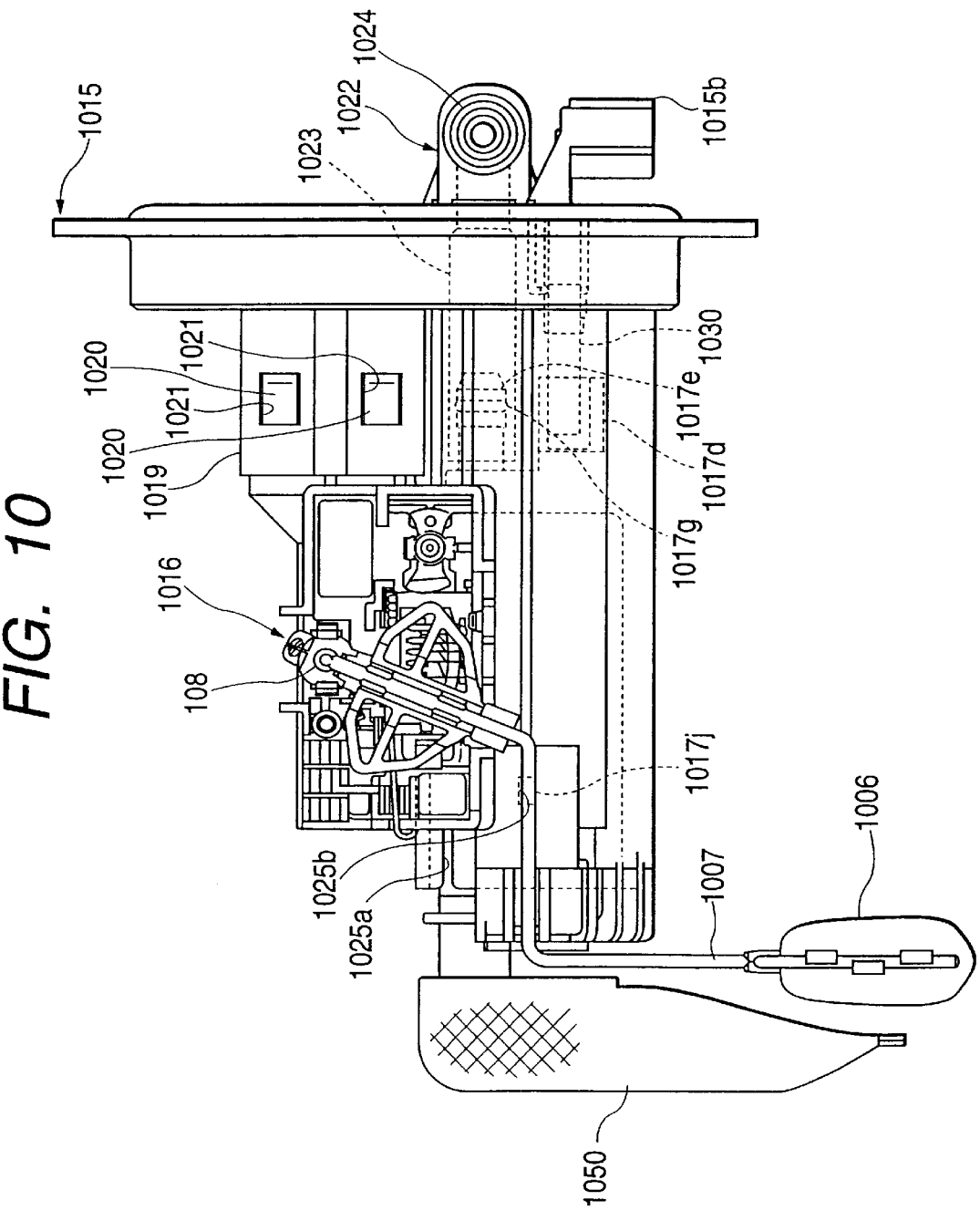
FIG. 10 is a side view of the whole fuel tank cap body structure in the mode 3 for carrying out the invention.
Figure 11:
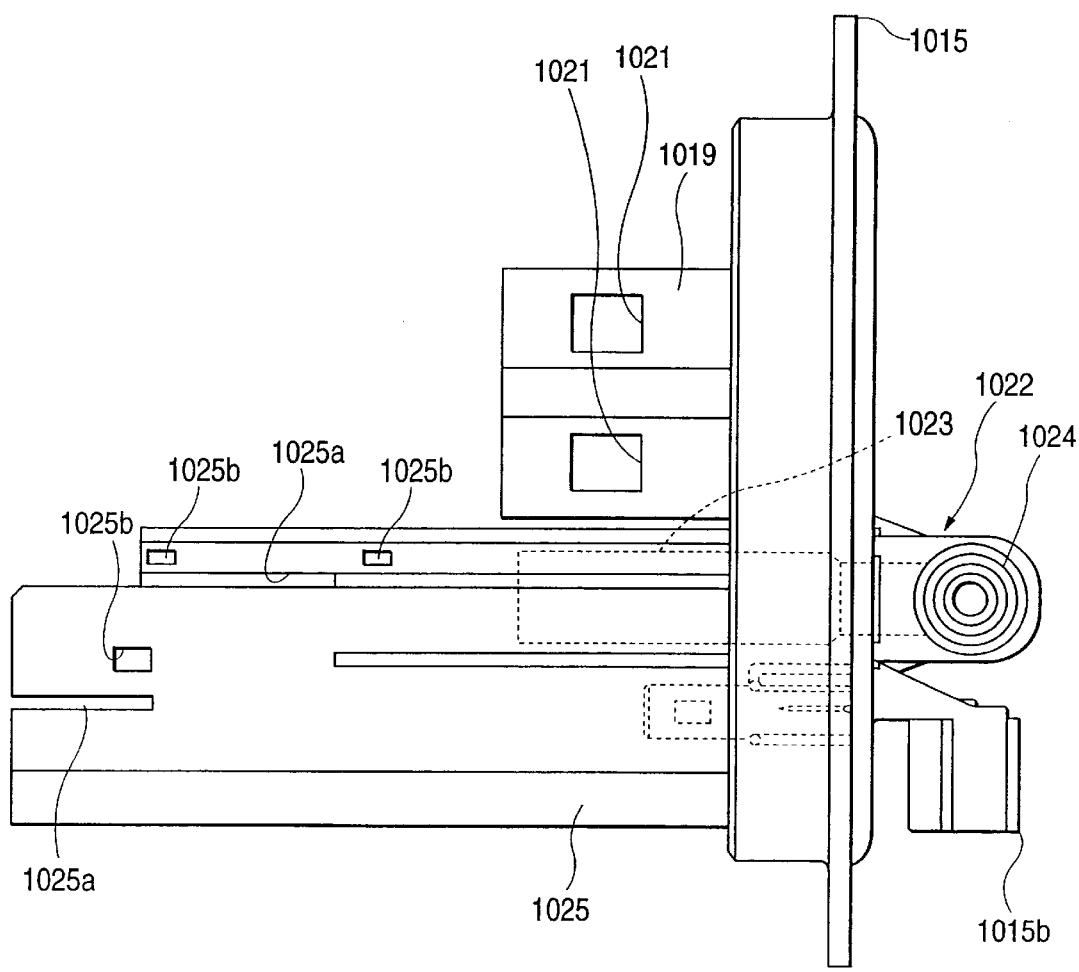
FIG. 11 is a side view of the cap body in the mode 3 for carrying out the invention.
Figure 12:
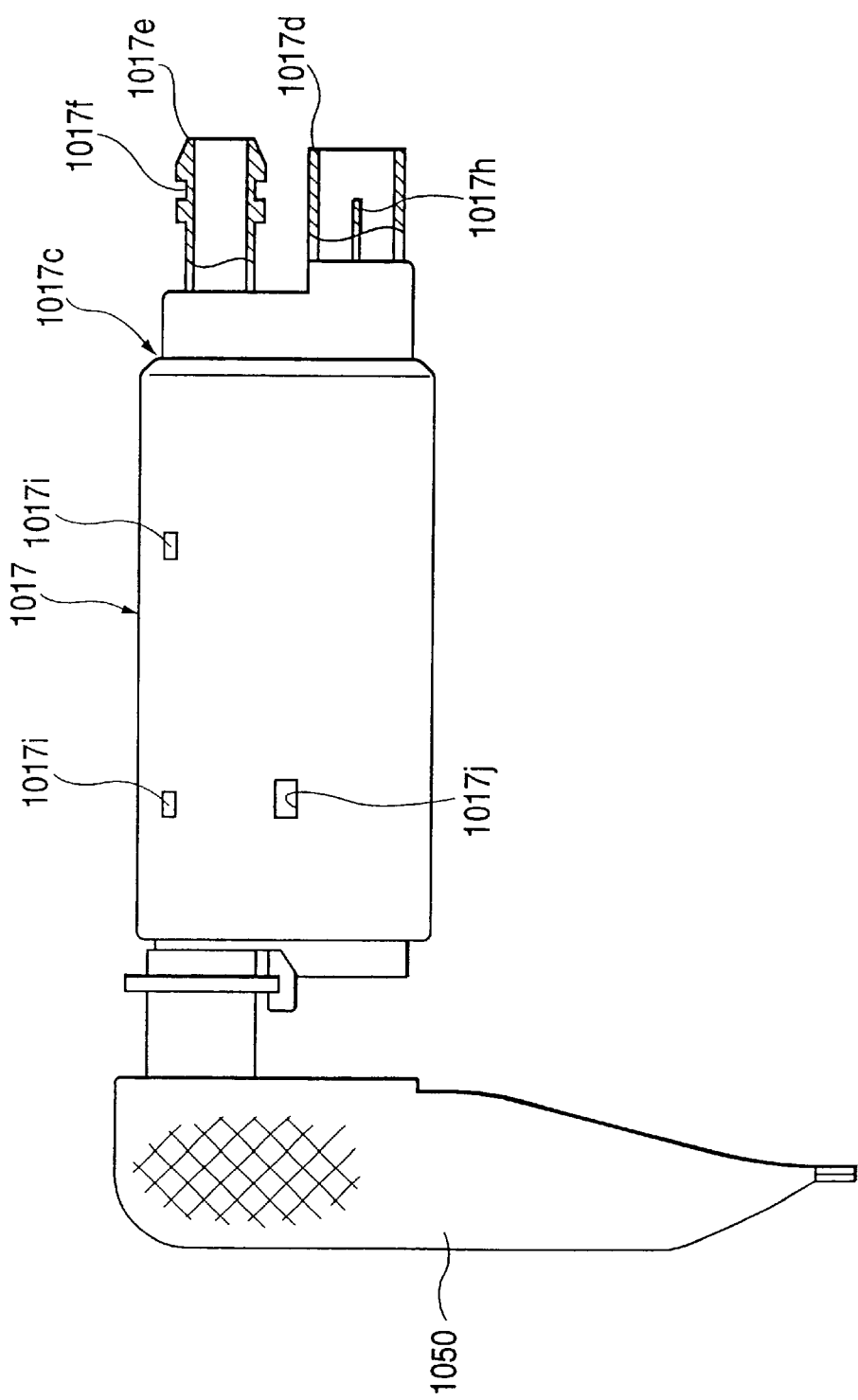
FIG. 12 is a side view of the fuel pump in the mode 3 for carrying out the invention.

FIGS. 10–12 show the structure of a cap for a fuel tank in a mode 3 for carrying out the invention.

In this mode for carrying out the invention, like reference characters designate like and equivalent component parts in the mode 2 for carrying out the invention.

In the structure of the cap body for the fuel tank in the mode 3 for carrying out the invention, a fuel-pump mounting wall 1025 which is arcuate in cross section is substantially perpendicularly extended from the cap body 1015 around the pump piping joint 1022 in order that the projected fuel outlet portion 1017e of the fuel pump 1017 is directly inserted and mounted in the pump fit-in portion 1023 formed in the pump piping joint 1022 of a cap body 1015.

The pump piping joint 1022 in this mode 3 for carrying out the invention is also extended downward as in the mode 2 for carrying out the invention.

Furthermore, guide projections 1017i and retaining pawls 1017j are directly formed in the outer wall surface of the fuel pump 1017 as shown in FIG. 12.

In the structure of the cap for the fuel tank in the mode 3 for carrying out the invention, the fuel pump 1017 is inserted in the direction of the cap body along the fuel-pump mounting wall 1025 extended substantially perpendicularly to the cap body 1015.

The outer wall surface of the fuel pump is smoothly inserted along the inner wall of the fuel-pump mounting wall 1025 because the fuel-pump mounting wall 1025 is substantially arcuate in cross section in harmony with the outer shape of the fuel pump 1017.

At this time, the guide projections 1017i are formed so as to be guided along the pump slits 1025a and used to connect the fuel pump 1017 to the pump piping joint 1022, whereby the projected outlet portion 1017e of the fuel pump 1017 is connected to the pump piping joint 1022 only by inserting the projected outlet portion 1017e as shown in FIG. 10 and sealed by the seal ring 1017g.

In the state where the projected fuel outlet portion 1017e has thus been connected, the retaining pawls 1017j are retained in the respective retaining holes 1025b to prevent the fuel pump 1017 from slipping off. The fuel pump 1017 is thus completely mounted in the cap body 1015.

Consequently the number of parts is decreased further because the potentiometer unit 1016 and the fuel pump 1017 can be mounted integrally in the cap body 1015 without using the pump holder 1027 in the mode 2 for carrying out the invention.

Moreover, not only assembling the potentiometer unit 1016, the fuel pump 1017 and the like but also from completely piping the pump for the purpose of connecting the projected fuel outlet portion 1017e to the pump piping joint 1022 up to electrical connections made by means of the relay connector 1030 only by inserting the potentiometer unit 1016 and the fuel pump 1017 in the cap body 1015 from one direction along the mounting walls. Hence, the number of manufacturing steps can be reduced and simultaneously assembly workability can be also be improved.

As the rest of arrangements and functions are substantially similar to those described in the mode 2 for carrying out the invention, the description thereof will be omitted.

(Mode 4)

Figure 13:
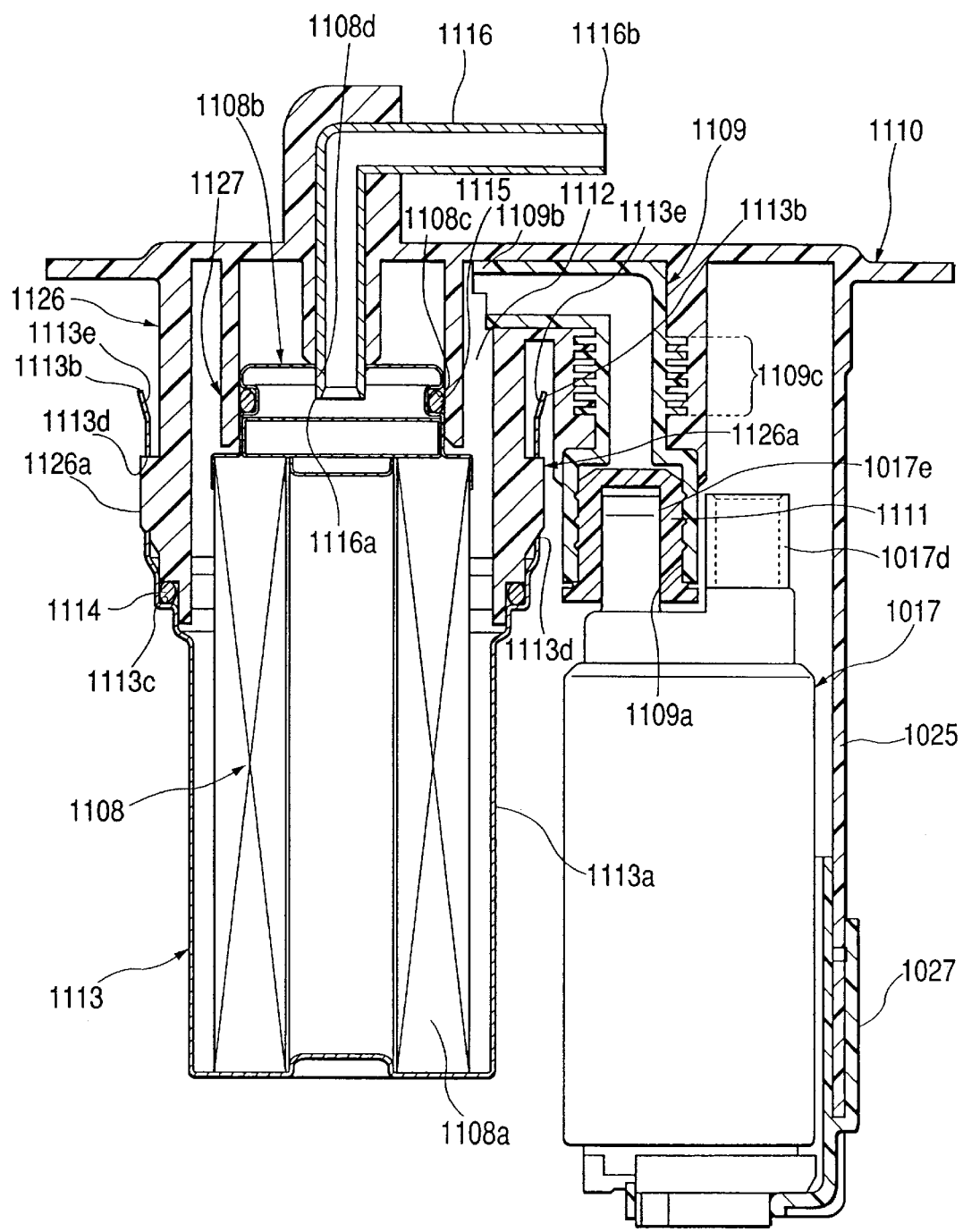
FIG. 13 is a sectional view of the whole fuel tank cap body structure in a mode 4 for carrying out the invention.
Figure 14:
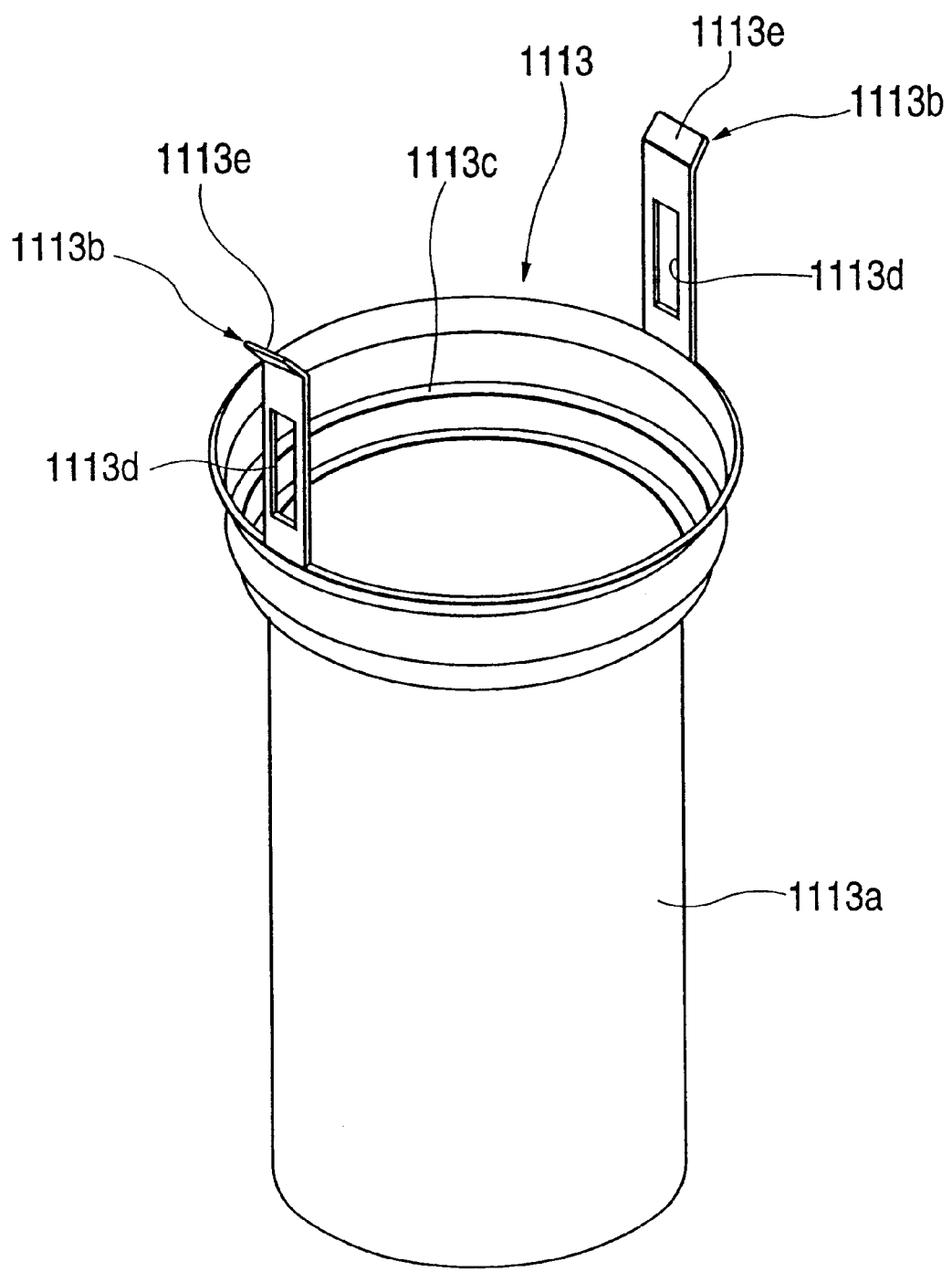
FIG. 14 is a perspective view of a filter bracket member 1113 in the fuel tank cap body in the mode 4 for carrying out the invention.

FIGS. 13–14 show the structure of a cap for a fuel tank in a mode 4 for carrying out the invention.

In this mode for carrying out the invention, like reference characters designate like and equivalent component parts in the modes 2, 3 for carrying out the invention.

In the structure of the cap body for the fuel tank in the mode 4 for carrying out the invention, a plastic connect tube member 1109 for coupling the fuel pump 1017 and a substantially cylindrical fuel filter 1108 is inserted in and integrally formed with a cap body 1110.

The connect tube member 1109 is substantially L-shaped in cross section and has, in one end portion, a fit-opening portion 1109a for fitting in the projected fuel outlet portion 1017e of the fuel pump 1017 via a cylindrical joint member 1111, and an exit-side end portion 1109b so disposed as to face a filter disposing space 1112.

Furthermore, a securing flange portion 1109c for increasing connecting force with the cap body 1110 is provided in the connect tube member 1109, the securing flange portion 1109c being formed by hardening molten resin introduced into gaps among projections on the outer peripheral face of the connect tube member 1109 at the time of the insert molding.

Furthermore, a cylindrical fuel-filter mounting outer side wall 1126 is formed integrally with the cap body 1110. On the outer side of the fuel-filter mounting outer side wall 1126, a pair of retaining pawls 1126a, 1126a are formed.

On the inner side of the fuel-filter mounting outer side wall 1126, a fuel-filter mounting inner side wall 1127, which is concentric with the outer side wall 1126 and smaller in diameter than that of the outer side wall 1126, is formed integrally with the cap body 1110.

Furthermore, the cap body 1110 is provided with an outlet tube 1116 which has been subjected insert molding beforehand, the outlet tube 1116 having one end 1116a face the inside of the filter disposing space 1112 and the other end 1011b communicating with the outside.

The fuel filter 1108 is disposed with the metal filter bracket member 1113 shown in FIG. 14 in the cap body 1110. The filter bracket member 1113 comprises a substantially cylindrical filter containing portion 1113a having a closed underside, a pair of retaining arms 1113b, 1113b which are formed integrally with the filter containing portion 1113a, and an O-ring-providing annular stepped-portion 1113c for disposing a sealing O-ring 1114, which O-ring-providing annular stepped-portion 1113c is formed on the inner wall side of the filter containing portion 1113a.

The retaining arms 1113b, 1113b are each formed with retaining holes 1113d, 1113d and tilted by a predetermined quantity so that the upper end edge portions 1113e, 1113e are readily mounted, whereby the upper end edge portions 1113e, 1113e can be subjected to elastic deformation in the direction in which they are expandable outward.

The fuel filter 1108 is constructed so as to pass the fuel from a filter body 1108a provided on the side into the interior and to send the fuel into a small-diameter portion 1108b. An O-ring-providing annular groove portion 1108c for mounting an O-ring 1115 is formed around the small-diameter portion 1108b.

By the use of the filter bracket member 1113 for mounting the fuel filter 1108 in the cap body 1110, the filter disposing space 1112 communicating with the exit-side end portion 1109b of the connect tube member 1109 is maintained in a watertight condition by the O-ring 1114 for sealing between the O-ring-providing annular stepped-portion 1113c and the fuel-filter mounting outer side wall 1126, and the O-ring 1115 for sealing between the small-diameter portion 1108b and the inside of the fuel-filter mounting inner side wall 1127.

Furthermore, a tube hole 1108d is formed in the surface of the small diameter portion 1108b. The aforesaid one end portion 1116a is inserted into the tube hole 1108d when the fuel filter 1108 is mounted in the cap body 1110 in such a way that the outlet tube 1116 is connected so as to supply the fuel passed through the fuel filter 1108 out of the outlet tube 1116.

A description will subsequently be given of the function of the invention in a mode 4 for carrying out the invention.

In this mode 4 for carrying out the invention, the O-ring 1115 is mounted in the O-ring-providing annular groove portion 1108c formed in the small-diameter portion 1108b of the fuel filter 1108 and when the small-diameter portion 1108b is inserted in the fuel-filter mounting inner side wall 1127.

Then one end portion 1116a of the outlet tube 1116 is inserted into the tube hole 1108d and the outlet tube 1116 is connected to the fuel filter 1108 so that the fuel passed through the fuel filter 1108 can be supplied outside from the outlet tube 1116.

The O-ring 1114 is mounted on the O-ring-providing annular stepped-portion 1113c of the filter bracket member 1113 and the filter body 1108a is contained in the filter containing portion 1113a and while the retaining arms 1113b, 1113b are being expanded outward, the retaining pawls 1126a, 1126b are respectively retained in the retaining holes 1113d, 1113d so as to seal the filter disposing space 1112 by means of the O-ring 1114 between the O-ring-providing annular stepped-portion 1113c and the fuel-filter mounting outer side wall 1126.

Since the connect tube member 1109 for coupling the fuel pump 1017 and the fuel filter 1108 is thus formed integrally with the cap body 1110 beforehand, it is only necessary to arrange the fuel pump 1017 and the fuel filter 1108 in order to complete the connection.

Consequently, parts heretofore used for connecting the fuel hose and the like can be dispensed with and the number of manufacturing steps becomes reducible with the effect of improving assembly workability.

At this time, the filter bracket member 1113 is used to mount the fuel filter 1101 in the cap body 1110 so as to seal the filter disposing space 1112 communicating with the exit-side end portion 1109b of the connect tube member 1109 and put the filter disposing space 1112 in a watertight condition.

Consequently, the fuel filter 1108 disposed in the filter disposing space 1112 is situated in the fuel flow channel to ensure that the fuel sent from the fuel tank is filtered by the fuel filter 1108.

Since any one of the conventional substantially-circular fuel filters 1108 can be employed, the manufacturing cost is reducible further in comparison with the fuel filter described in the modes 2, 3 for carrying out the invention.

Since the one end portion 1116a of the outlet tube 1116 integrally formed with the cap body 1110 beforehand is exposed in the filter disposing space 1112, the tube hole 1108d of the fuel filter 1108 is connected to the one end portion 1116a when the fuel filter 1108 is mounted in the cap body 1110.

Consequently, the part used to connect the outlet tube 1116 of the fuel hose to the fuel filter 1108, for example, can be dispensed with and the number of manufacturing steps becomes reducible with the effect of improving assembly workability.

In this mode 4 for carrying out the invention, the pump holder 1027 is used to mount the fuel pump 1017 in the cap body 1110 and the projected outlet portion 1018b is mounted in the fit-opening portion 1109a via the cylindrical joint member 1111, whereby the order in which the fuel pump 1017 and the fuel filter 1108 are mounted is not restricted. Therefore, the freedom of assembling the component parts is increased in comparison with the closed cap 1014 in the modes 2, 3 for carrying out the invention with the effect of improving assembly workability.

(Mode 5)

Figure 15:
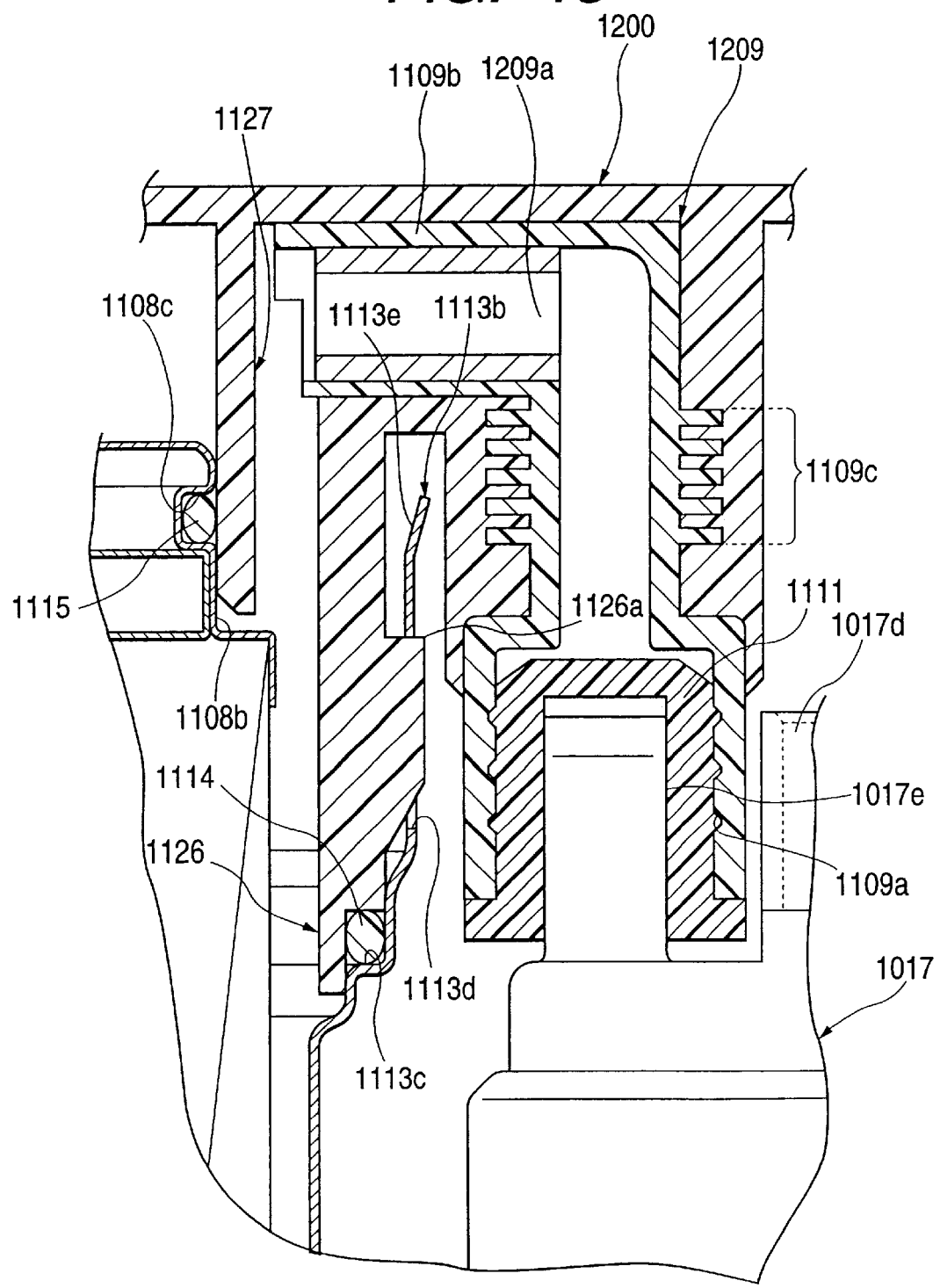
FIG. 15 is a sectional view of the principal part of the fuel tank cap body in a mode 5 for carrying out the invention.

FIG. 15 shows a connect tube member 1209 that has been subjected to monolithic insert molding beforehand in cap body 1200 in the mode 5 for carrying out the invention.

In this connect tube member 1209, a metal cylindrical reinforcing member 1290a is disposed on the inner side of the exit-side end portion 1109b.

In the fuel tank cap body thus structured in the mode 5 for carrying out the invention, since the inner side of the exit-side end portion 1109b has been reinforced with the metal cylindrical reinforcing member 1290a, even though the wall thickness of the fit-opening portion 1109a is set thinner, there is no fear of destroying the insert molding portion.

The description of effect of the invention will be omitted as the functions and effect thereof are similar to those described in modes 2–4 for carrying out the invention.

Although it has been arranged in the modes 2, 3 for carrying out the invention that the connector portion 1017d is electrically connected to the connector 1015b formed on the cap body 1015 (1115) via the relay connector 1030 by inserting the fuel pump 1017 (1117), the connector portion 1017d may be electrically connected to the connector 1015b by directly engaging the connector portion 1017d with the connector 1015b.

(Mode 6)

FIGS. 16–22 show a mode 6 for carrying out the invention, in which like reference characters designate like and equivalent component parts in the aforesaid prior art examples.

Figure 19:
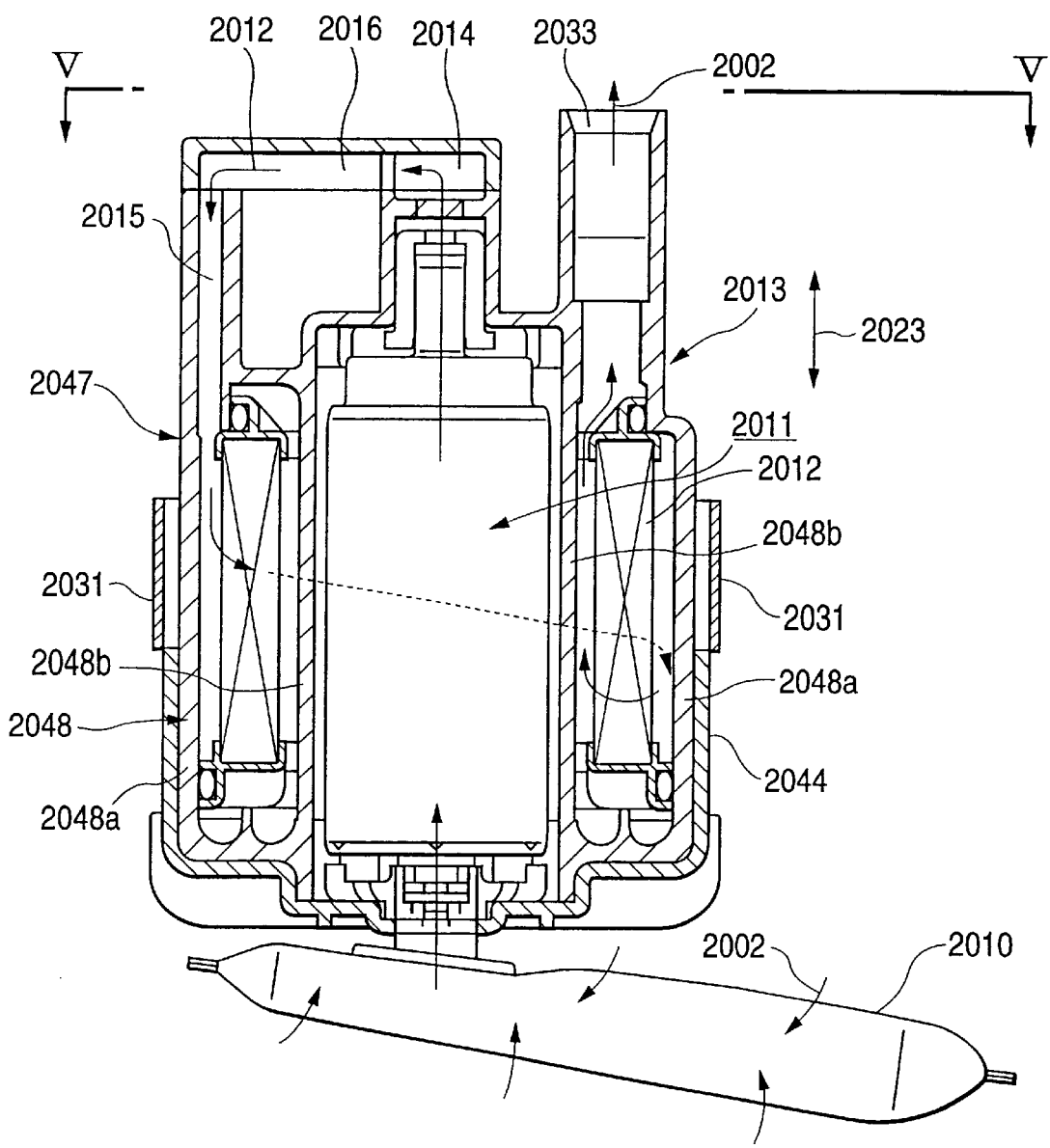
FIG. 19 is a sectional view of a filter-equipped pump of FIG. 18.
Figure 20:
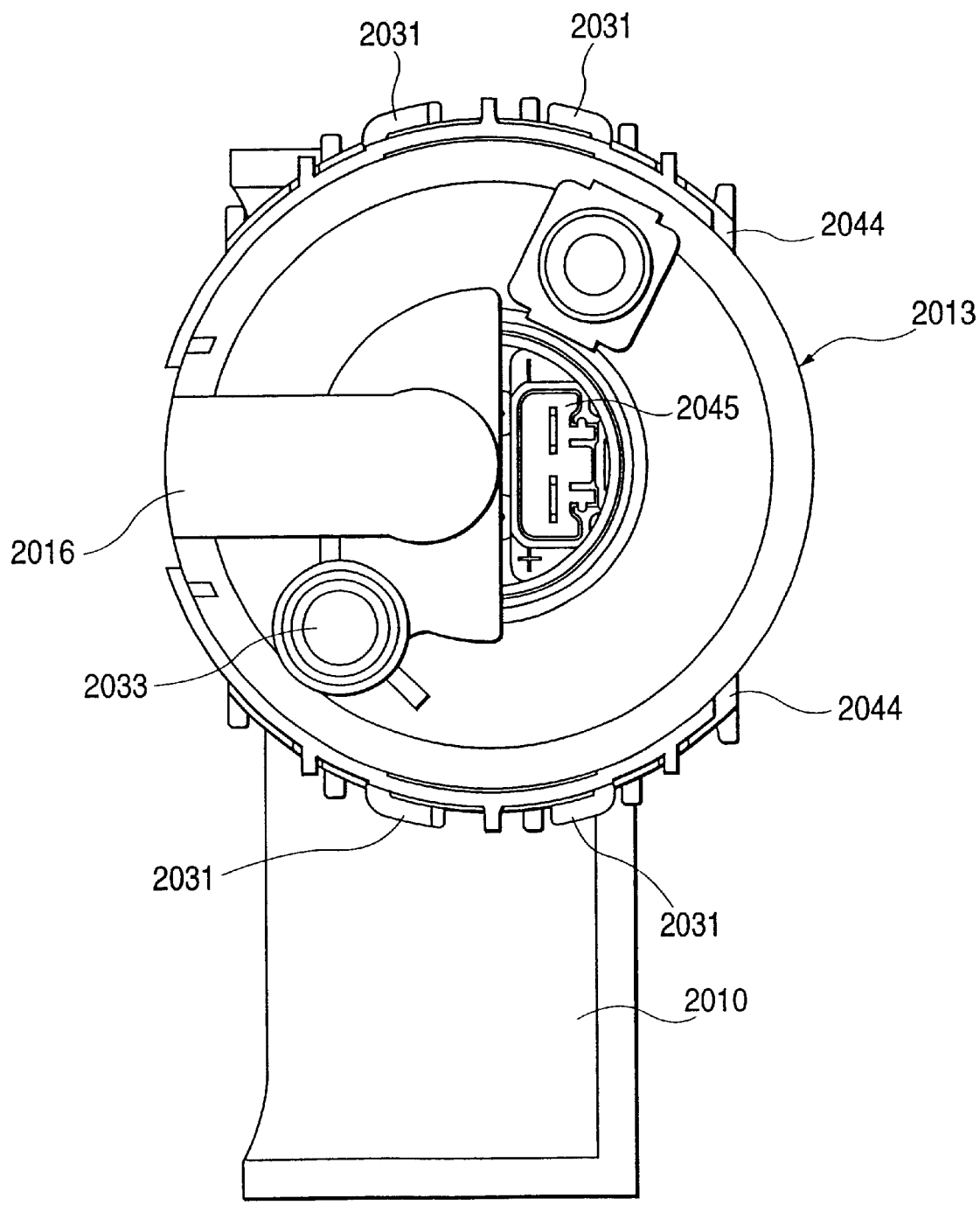
FIG. 20 is a sectional view taken on line V—V of FIG. 19.

In the mode 6 for carrying out the invention, a fuel pump portion 2011 for sucking fuel 2002 and feeding the fuel thus sucked into an internal combustion engine, for example, and a fuel filter portion 2012 for removing alien substances contained in the fuel 2002 are integrally formed as shown in FIG. 19 to constitute a columnar filter-equipped pump 2013.

More specifically, the columnar filter-equipped pump 2013 is constituted of the columnar fuel pump portion 2011 and a fuel filter portion 2012 which is concentrically and integrally overlaid on the outer periphery of the fuel pump portion 2011. The fuel filter portion 2012 is normally provided on the suction side of an engine and the use of the filter-equipped pump 2013 makes it unnecessary to provide the engine with a fuel filter separately.

Furthermore, a coupling flow channel 2016 in the filter-equipped pump 2013 is used for coupling the discharge port 2014 of the fuel pump portion 2011 and an inlet 2015 for the filter of the filter-equipped pump 2013.

In addition, a fuel tank cap body 2017 capable of closing the fuel tank opening formed in the surface of a fuel tank (not shown) and a fuel discharge flow channel portion 2018 and a fuel return flow channel portion 2019 are passed through the fuel tank cap body 2017.

Furthermore, a one-touch mounting portion 2020 is provided between the fuel tank cap body 2017 and the filter-equipped pump 2013 so that both component parts can be mounted with one touch to fabricate a fuel tank cap body unit 2021. The one-touch mounting portion 2020 has the following structure.

First, a cylindrical or partially cylindrical filter-equipped support wall 2022 is projected from the underside (the inner side portion of the fuel tank) of the fuel tank cap body 2017 in a direction 2023 in which the fuel tank cap body unit 2021 is inserted in the fuel tank in such a way as to surround the fuel discharge flow channel portion 2018 and the fuel return flow channel portion 2019.

Then the inner diameter of the filter-equipped support wall 2022 thus formed on the underside of the fuel tank cap body 2017 is made substantially equal to the outer diameter of the filter-equipped pump 2013. Furthermore, a plurality of reinforcing ribs 2024 extending in the aforesaid inserting direction 2023 are integrally formed with the peripheral edge portion of the filter-equipped support wall 2022 to secure rigidity necessary for supporting the filter-equipped pump 2013.

A filter-equipped pump mounting portion 2025 capable of fit-retaining the filter-equipped pump 2013 is formed on the front end side (the lower end side in the drawing) of the filter-equipped support wall 2022. Furthermore, a retaining pawl 2026 is formed in a plurality of peripheral places on the side of the filter-equipped pump 2013 and a plurality of retaining holes 2027 for use in retaining the retaining pawls 2026 are formed in the respective positions corresponding to the filter-equipped pump mounting portion 2025. In this case, that is, in this mode 6 for carrying out the invention, the filter-equipped pump mounting portion 2025 is formed in the position where the reinforcing ribs 2024 are formed out of the filter-equipped support wall 2022.

Furthermore, a plurality of slit-like cutaway portions 2028 extending in the inserting direction 2023 from the front end are formed in the filter-equipped pump mounting portion 2025 of the filter-equipped support wall 2022 in order to separate a retaining piece portion 2029 formed with the retaining holes 2027 from a guide piece portion 2030 without the retaining holes 2027; this arrangement is intended to facilitate the expansion, guiding and holding of the filter-equipped pump mounting portion 2025 in the diametrical direction when the filter-equipped pump 2013 is fitted in.

A guide body 2031 is formed in a position corresponding to each cutaway portion 2028 on the side of the filter-equipped pump 2013 and by fitting the fuel tank cap body 2017 and the filter-equipped pump 2013 together by properly positioning the guide bodies 2021 and the cutaway portions 2028 to ensure that a joint portion 2032 at the lower end of the fuel discharge flow channel portion 2018 passed through the fuel tank cap body 2017 and the discharge port 2033 of the fuel filter portion 2012, so that an arrangement of the joint portion 2032 at the lower end of the fuel discharge flow channel portion 2018 and the discharge port 2033 of the fuel filter portion 2012 is set.

Figure 21:
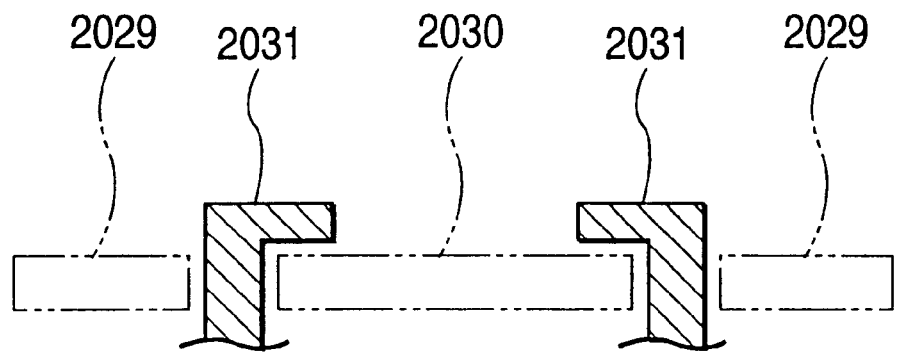
FIG. 21 is a sectional view of a guide body taken on line VII—VII of FIG. 16.
Figure 22:
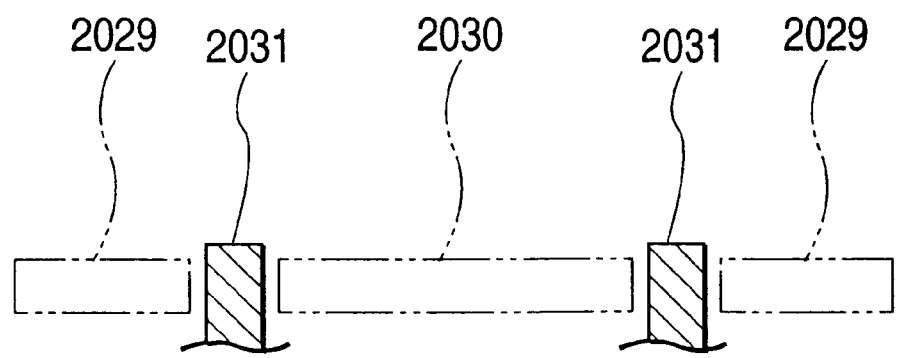
FIG. 22 is a similar view to FIG. 21 showing another guide body.

The guide body 2031 formed on the side of the filter-equipped pump 2013 may be, as shown in FIG. 21, in the form of a channel that can be plugged in such a state that it holds the guide piece portion 2030 or otherwise in the form of a projection extending in the aforesaid inserting direction 2023.

In the case of a partially cylindrical filter-equipped support wall 2022, furthermore, a level meter 2035 may be mounted in a portion where the cylindrical shape is absent. The level meter 2035 main comprises a mounting portion 2036 with respect to the fuel tank cap body 2017, a detecting portion 2037 such as a variable resistor, a float portion 2038 and an arm portion 2039 which is extended from the detecting portion 2037 and connected to the float portion 2038. The level meter 2035 may be mounted beforehand before the filter-equipped pump 2013 and the fuel tank cap body 2017 are incorporated by bringing the mounting portion 2036 fixedly into contact with or fixedly inserting the mounting portion 2036 in the mounting seat 2040 integrally formed with the cylindrical-shape-absent portion 2034 of the fuel tank cap body 2017. At this time, the mounting portion 2036 of the level meter 2035 may be extended in the inserting direction with the formation of a cylindrical face-like or otherwise a V-shaped groove-like guide surface on the back of the mounting portion 2036 in order to form a guide-hold portion 2041 for guiding the insertion of the filter-equipped pump 2013 and holding the filter-equipped pump 2013 after it has been fabricated.

Figure 16:
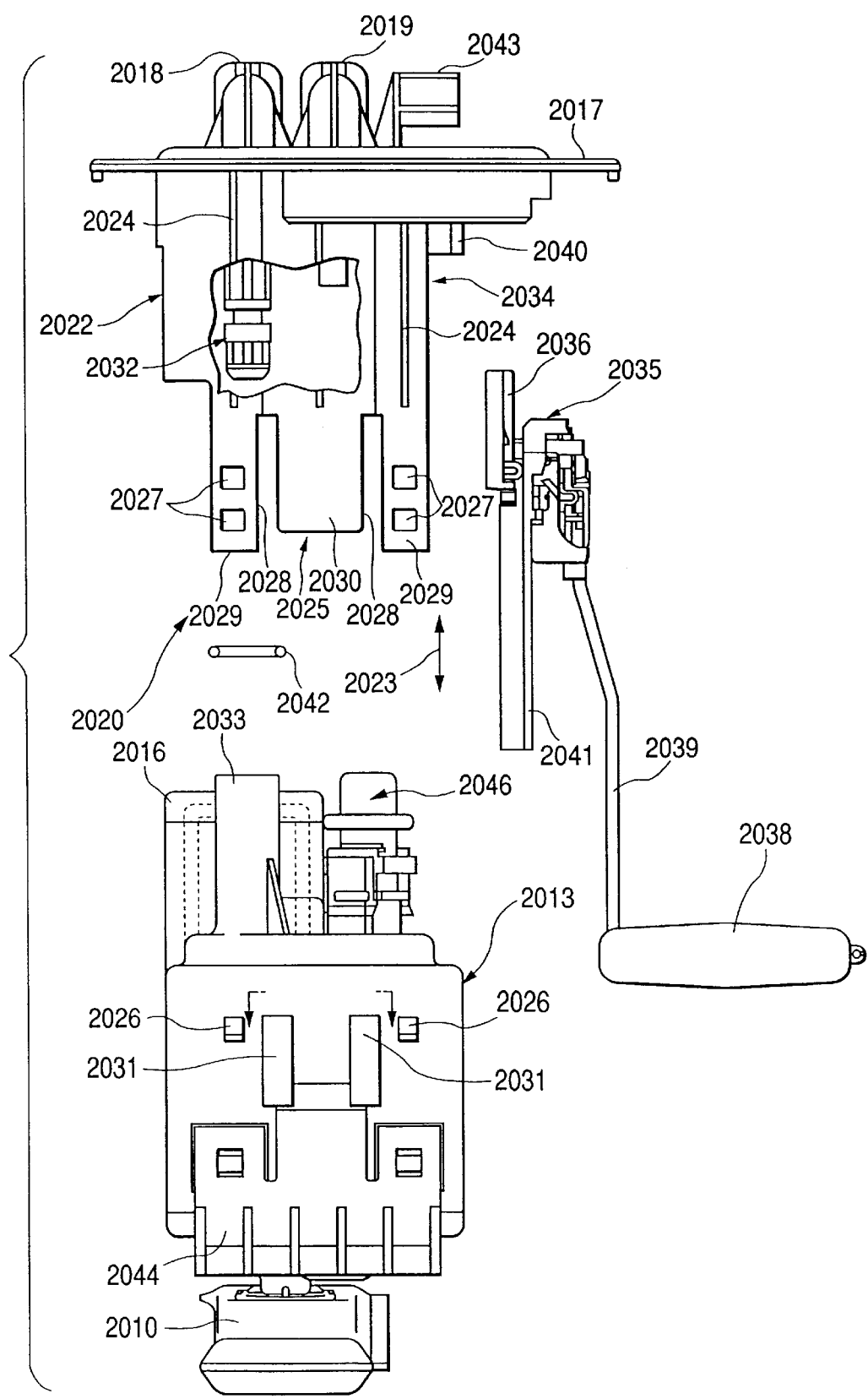
FIG. 16 is an exploded side view in a mode 6 for carrying out the invention.
Figure 17:
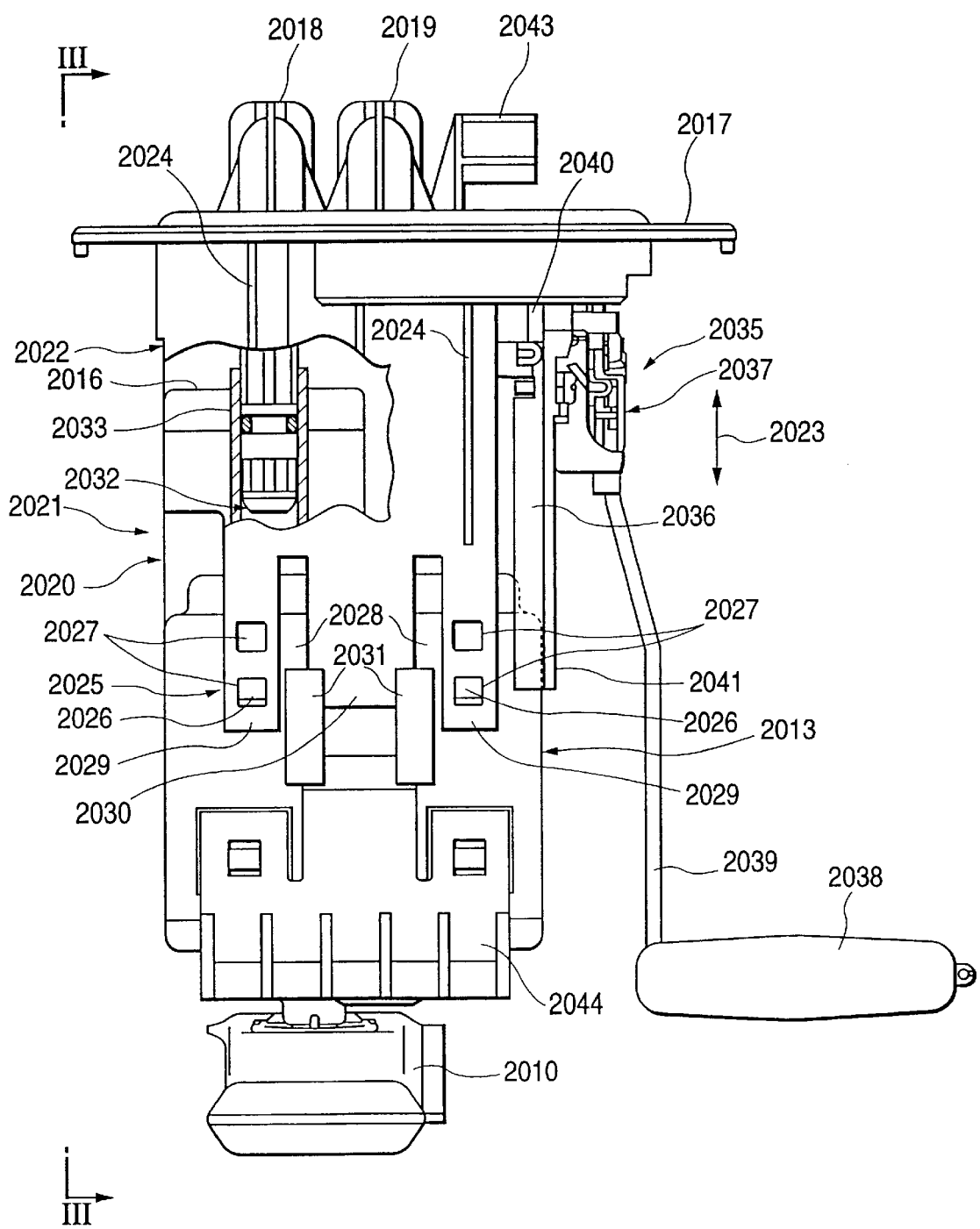
FIG. 17 is an assembly diagram of FIG. 16.
Figure 18:
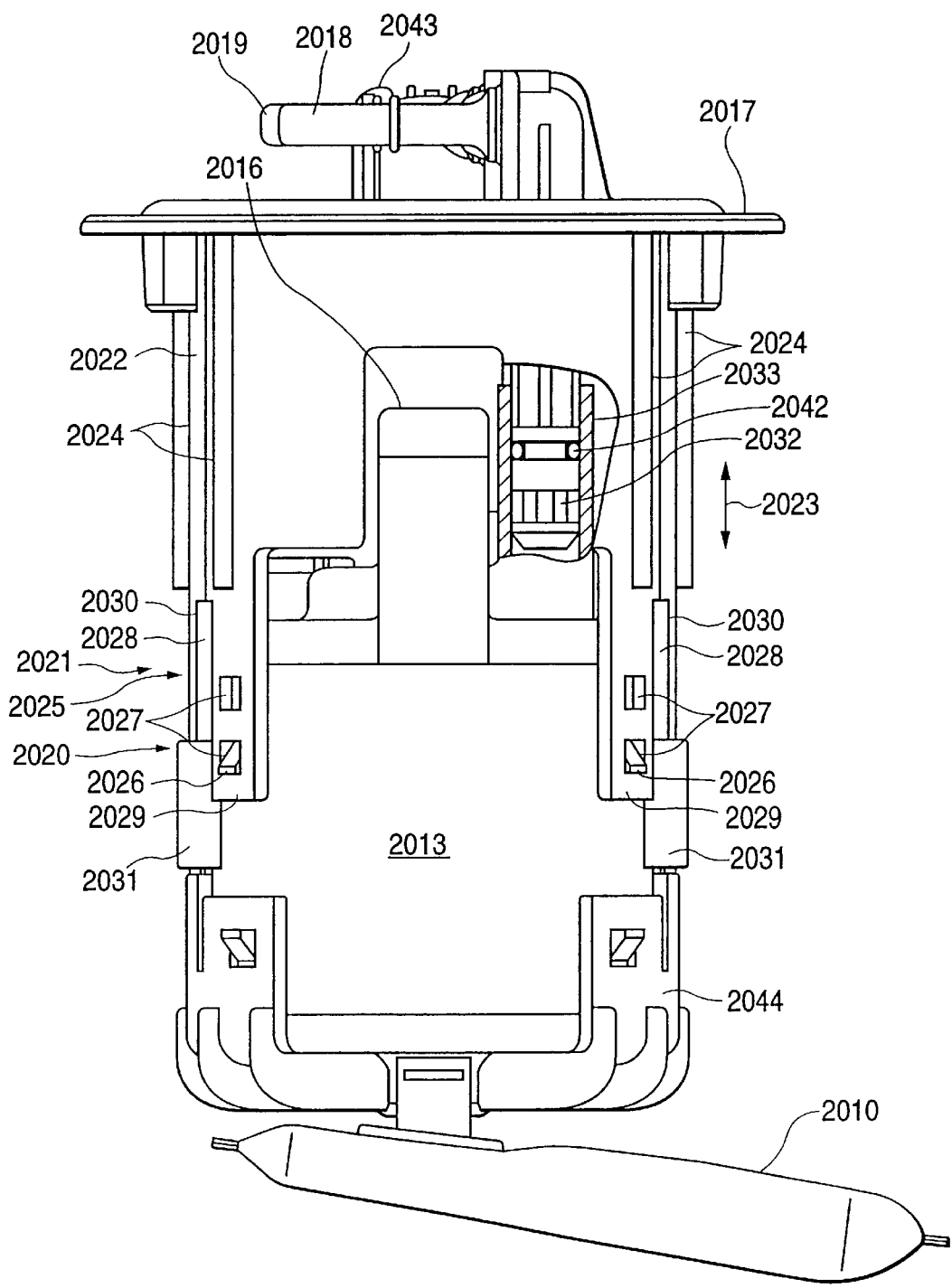
FIG. 18 is a sectional diagram taken on line III—III of FIG. 17.

In FIG. 16, reference numeral 2042 denotes a seal such as an O-ring fitted to the joint portion 2032 at the lower end of the fuel discharge flow channel portion 2018; 2043, a connector for supplying power to the cap portion, which connector is provided on the fuel tank cap body 2017; 2047, a filter housing whose lower peripheral wall 2048 is formed with a double wall 2048a, 2048b and whose lower end is closed with a bottom member whose double wall 2048a, 2046b contain the fuel filter portion 2012 therebetween. Furthermore, the fuel pump portion 2011 is inserted from below in the cylindrical space formed inside the lower portion 2048 and closed with a pump support member 2044 from below so as to prevent the fuel pump portion 2011 from slipping off. Furthermore, reference numeral 2044 denotes the pump support member mounted on the base of the filter-equipped pump 2013; 2046, a pressure regulator for regulating oil pressure 2002; and 2045 in FIG. 20, a connector for supplying power to the pump portion provided in the filter-equipped pump 2013.

The operation in the mode 6 for carrying out the invention will be described with reference to FIG. 16.

A description will first be given of a procedure for assembling the fuel tank cap body unit.

The guide body 2031 formed on the side of the filter-equipped pump 2013 and the cutaway portion 2028 formed in the filter-equipped pump mounting portion 2025 of the fuel tank cap body 2017 are properly positioned in the peripheral direction, and the fuel tank cap body 2017 and the filter-equipped pump 2013 are fitted together. Then the plurality of the retaining pawls 2026 formed in the peripheral places on the side of the filter-equipped pump 2013 are each retained in the plurality of retaining holes 2027 bored in the corresponding positions of the filter-equipped pump mounting portion 2025.

Thus, the outlet 2033 of the fuel filter portion 2012, which outlet is not visually inspected because of the cylindrical or partially cylindrical filter-equipped support wall 2022 is surely coupled to the joint portion 2032 at the lower end of the fuel discharge flow channel portion 2018 passed through the fuel tank cap body 2017, so that the fuel tank cap body unit 2021 is assembled.

Then the filter-equipped pump 2013 of the fuel tank cap body unit 2021 thus assembled is inserted in the fuel tank opening formed on the surface of the fuel tank and the fuel tank opening is closed with the fuel tank cap body 2017 of the fuel tank cap body unit 2021.

The flow of the fuel 2002 in the fuel tank cap body unit 2021 thus assembled will be described.

When the fuel pump portion 2011 of the filter-equipped pump 2013 is driven as shown in FIG. 19, the fuel 2002 in the fuel tank is sucked through the suction-side filter 2010 mounted on the suction side of the fuel pump portion 2011 as shown by an arrow and relatively large alien substances contained in the fuel 2002 are removed by the suction-side filter 2010. The fuel 2002 discharged from the discharge port 2014 of the fuel pump portion 2011 is sent to the inlet 2015 of the fuel filter portion 2012 provided in the outer periphery of the fuel pump portion 2011 via the coupling flow channel 2016 as shown by the arrow and made to enter fuel filter portion 2012 from the inlet 2015. While the fuel 2002 is flowing in such a way as to flow around the outer periphery of the fuel pump portion 2011 of the fuel filter portion 2012, it is passed through the filter, whereby the alien substances contained therein are completely removed. The fuel 2002 discharged from the output let 2033 of the fuel filter portion 2012 is introduced into the fuel discharge flow channel portion 2018 passed through the fuel tank cap body 2017 via the joint portion 2032 as indicated by the arrow. Then the fuel is sent from the fuel discharge flow channel portion 2018 to an engine such as an internal combustion engine via a fuel hose (not shown) Incidentally, the positional relation between the coupling flow channel 2016 and the outlet 2033 of the fuel filter portion 2012 in FIG. 19 has been changed from those shown in the other drawings for the convenience of illustration.

As set forth above, according to the present invention, the fuel pump portion 2011 and the fuel filter portion 2012 are integrated together to form the cylindrical filter-equipped pump 2013. By providing the one-touch mounting portion 2020 between the fuel tank cap body 2017 that can be mounted in the opening of the fuel tank formed in the surface of the fuel tank and the filter-equipped pump 2013, both of them can be fitted together with one touch to ensure that high assembly workability is attainable.

At this time, since the columnar filter-equipped pump 2013 is, as shown in FIG. 19, constituted of the columnar fuel pump portion 2011 and the fuel filter portion 2012 which is concentrically and integrally overlaid on the outer periphery of the fuel pump portion 2011, the whole body can be formed into a compact columnar body and besides only by conforming the fuel tank opening to either larger one of the diameters of the filter-equipped pump 2013 or the filter-equipped support wall 2022 of the filter-equipped support wall 2022 of the fuel tank cap body 2017, the fuel tank opening becomes reducible to the extent stated above.

Since the one-touch mounting portion 2020 comprises the retaining pawls 2026 formed on the side of the filter-equipped pump 2013, the filter-equipped support wall 2022 capable of supporting the filter-equipped pump 2013, the filter-equipped pump mounting portion 2025 extended from the front end of the filter-equipped support wall 2022, and the retaining holes 2027 capable of retaining the retaining pawls 2026, whereby to readily assembly the filter-equipped pump 2013 and the fuel tank cap body 2017 together.

Since the plurality of reinforcing ribs 2024 are formed on the cylindrical or partially cylindrical filter-equipped support wall 2022 protruded from the underside (the inner portion of the fuel tank) of the fuel tank cap body 2017, it is possible to secure the rigidity necessary for supporting the filter-equipped pump 2013 without compression. In the mode 6 for carrying out the invention, more specifically, the support rigidity of the filter-equipped pump 2013 is able to effectively secure the rigidity of the filter-equipped support wall 2022 in the proximity of the filter-equipped pump mounting portion 2025 since the reinforcing rib 2024 is formed in the position where the filter-equipped pump mounting portion 2025 is formed.

Furthermore, the plurality of cutaway portions 2028 extending in the inserting direction 2023 are formed in the filter-equipped pump mounting portion 2025 at the front end of the filter-equipped support wall 2022 in order to separate the retaining piece portion 2029 formed with the retaining holes 2027 from the guide piece portion 2030 without the retaining holes 2027, whereby the filter-equipped pump mounting portion 2025 is expanded in the diametrical direction to readily fit the filter-equipped pump 2013 in the front end of the filter-equipped support wall 2022.

Moreover, the cutaway portion 2028 formed in the front end of the filter-equipped support wall 2022 is able to demonstrate the function of properly deciding the peripheral position with respect to the guide body 2031 formed on the side of the filter-equipped pump 2013 and when the fuel tank cap body 2017 and the filter-equipped pump 2013 are fitted together, the outlet 2033 of the fuel filter portion 2012 can surely be coupled to the joint portion 2032 at the lower end of the fuel discharge flow channel portion 2018 passed through the fuel tank cap body 2017.

When the level meter 2035 is mounted in the portion 2034 with the absence of the cylindrical shape in the partial cylindrical shape of the filter-equipped support wall 2022, the mounting portion 2036 of the level meter 2035 is extended to form a guide hold portion 2041 and by forming the cylindrical or V-groove guide face on the underside of the mounting portion 2036, whereby the filter-equipped pump 2013 can be guided and held at the time of assembly.

When the filter-equipped pump 2013 and the fuel tank cap body 2017 are assembled together, with the omission of the level meter 2035, the joint portion 2032 at the lower end of the fuel discharge flow channel portion 2018 and the outlet 2033 of the fuel filter portion 2012 can visually be fitted together from the portion 2034 in the absence of the cylindrical shape, so that mounting efficiency can be improved further.

Although a detailed description has been given of the mode 1–6 for carrying out the invention with reference to the drawings, the specific construction of the invention is not limited to those mode for carrying out the invention but may be altered without departing the spirit and scope of the invention such that, in the mode 6 for carrying out the invention, for example, the columnar filter-equipped pump 2013 is constituted of the columnar fuel pump portion 2011 and the fuel filter portion 2012 which is concentrically and integrally overlaid on the outer periphery of the fuel pump portion 2011 to make the whole fuel tank cap body compact. However, any other arrangement may be employed in that the fuel pump portion 2011 and the fuel filter portion 2012 are integrated together beforehand even when the fuel filter portion 2012 is vertically positioned between the joint portion 2032 at the lower end of the fuel discharge flow channel portion 2018 and the fuel pump portion 2011.

Although it has been arranged in the modes 2, 3 for carrying out the invention that the connector portion 1017*d* is electrically connected to the connector 1015*b* formed on the cap body 1015 (1115) via the relay connector 1030 by inserting the fuel pump 1017 (1117), the connector portion 1017*d* may be electrically connected to the connector 1015*b* by directly engaging the connector portion 1017*d* with the connector 1015*b*.

As set forth above, according to the present invention, since the rotary tank which has the flat base that comes in contact with the base of the fuel tank and is capable of fixedly containing the filter-equipped pump and the rotary-tank mounting wall of the fuel tank cap body is made flexibly movable by the flexible mechanism, the whole length of the fuel tank cap body unit is adjusted to the depth of the fuel tank when the fuel tank cap body unit is inserted in the fuel tank and when the flat base of the rotary tank is brought into contact with the base of the fuel tank, the rotary tank and the fuel tank cap body are shrinkingly moved, whereby various fuel tanks different in shape and size are usable in the fuel tank cap body unit.

Even though the base of the fuel tank has a stepped portion or is tilted, the suction of fuel by means of the filter-equipped pump can be prevented from being impeded since the positional relation between the rotary tank and the filter-equipped pump is held constant.

As the fuel tank cap body 19 is mounted in such a state that the rotary tank has been integrated with the filter-equipped pump, assembly work is facilitated.

According to the present invention, the filter-equipped pump can be formed into a simple columnar body by overlaying the filter portion on the outer periphery of the fuel pump. Moreover, disposing the fuel filter portion on the outer periphery of the fuel pump portion makes it possible to provide a larger capacity for the fuel filter portion while lowering the whole height of the filter-equipped pump, which results in securing high filter efficiency.

As claimed in claim 3 according to the present invention, the plurality of cylindrical guide portions is provided in one of the rotary tank and the rotary-tank mounting wall and the guide members each of which is formed on the other side thereof and can slidably be fitted in each cylindrical guide portions, whereby the juxtaposition of the elastic material is facilitated and the flexible movement of the rotary tank and the fuel tank cap body is stably carried out. It is thus possible to secure a wider opening in between the cylindrical guide portion of the rotary-tank mounting wall or the guide member. While the inside is visually inspected through the opening, the joint of the flexible tube and the inner end portion of the fuel discharge flow channel portion are coupled together to ensure that the coupling state of the piping system is maintained and that the fuel tank cap body unit can easily be assembled.

According to the present invention, the base of the rotary tank is brought into contact with the base of the fuel tank to position the level meter by mounting the level meter in the rotary tank or the rotary-tank mounting wall, so that the invention is able to demonstrate practical effectiveness.

What is claimed is:

1. A fuel tank cap body unit comprising:
    a filter-equipped pump including a fuel pump portion and a fuel filter portion, integrally provided with said fuel pump portion, said filter-equipped pump having a backing member;
    a rotary tank, having a flat base so that a base of a fuel tank is brought into contact with said rotary tank, said rotary tank having a side surface defining a plurality of slits formed along an axial direction, and a recessed line axially extending from said base wherein said backing member receives said recessed line in order to constitute a stopper for regulating a fitting position of said filter-equipped pump with respect to said rotary tank, and wherein said filter-equipped pump is fixedly contained in said rotary tank to integrate said rotary tank with said filter-equipped pump;
    a fuel tank cap body including:
        a fuel discharge flow channel portion therethrough; and
        a rotary tank mounting wall which accommodates at least said rotary tank and said filter-equipped pump, said rotary tank mounting wall made of resin and including a plurality of pawls slidably fitted in respective ones of said plurality of slits,
    wherein said rotary tank mounting wall provided for said rotary tank and fuel tank cap body is fitted such that said rotary tank mounting wall can be made flexibly movable via said pawls fitted in said slits.

2. A fuel tank cap body unit as claimed in claim 1, wherein said filter-equipped pump comprises of a columnar fuel pump portion and said fuel filter portion which is concentrically and integrally overlaid on an outer periphery of said fuel pump portion.

3. A fuel tank cap body unit as claimed in claims 1 or 2, further comprising a flexible mechanism that comprises:
    an elastic member, installed between one of cylindrical guide portions and one of guide members, said cylindrical guide portions formed in said rotary tank, and each of said guide members being formed on a side of said rotary tank mounting wall, and operative to be slidably fit in each of said cylindrical guide portions,
    wherein a flexible tube which can be coupled to an inner end portion of said fuel tank in a fuel discharge flow channel portion passed through said fuel tank cap body is connected to an outlet of said fuel filter portion of said filter-equipped pump, and
    wherein an opening for facilitating a coupling of a joint of said flexible tube to said inner end portion of said fuel tank in said fuel discharge flow channel portion is formed between said cylindrical guide portions of one of said rotary-tank mounting wall and said guide members provided for said fuel tank cap body.

4. A fuel tank cap body unit as claimed in claim 1, wherein a level meter is mounted in one of said fuel tank cap body and said rotary tank.

5. A fuel tank cap body unit as claimed in claim 1, wherein said flexible mechanism comprises:
    an elastic member disposed between the fuel tank cap body and the rotary tank,
    wherein a flexible tube coupled to an inner end portion of said fuel tank in a fuel discharge flow channel portion passed through said fuel tank cap body is connected to an outlet of said fuel filter portion of said filter-equipped pump, and
    wherein an opening for facilitating a coupling of a joint of said flexible tube to said inner end portion of said fuel tank in said fuel discharge flow channel portion is formed between said cylindrical guide portions of one of said rotary-tank mounting wall and said guide members provided for said fuel tank cap body.

6. A fuel tank cap body structure comprising:
    a fuel tank cap body mounted in a rotary tank, said fuel tank cap body including a fuel-supply-related mechanism mounting wall, the fuel-supply-related mechanism mounting wall being made of resin and formed in such a way as to surround a piping connecting portion passed through a top portion of said fuel tank cap body, the fuel-supply-related mechanism mounting wall extending in an inward direction of said rotary tank; said fuel-supply-related mechanism mounting wall having a substantially circular shape in cross section in harmony with said opening of said rotary tank, wherein an outer dimension of said fuel-supply-related mechanism mounting wall thereof is smaller than an inner diameter of said opening of said rotary tank, said fuel-supply-related mechanism being disposed in said circular shape;
    an integral fuel-supply-related mechanism for sucking fuel toward an inner side of the fuel tank cap body disposed in an opening portion of said rotary tank;
    guide means provided for guiding and connecting a pipe of said fuel-supply-related mechanism to said piping connecting portion by inserting said rotary tank along said fuel-supply-related mechanism mounting wall towards a top portion of said fuel tank cap body; and retaining means for preventing said fuel-supply-related mechanism from slipping off when said fuel-supply-related mechanism has been connected to said piping connecting portion, wherein said rotary tank has a side surface including a retaining hole, and wherein said fuel-supply-related mechanism has a periphery which includes a retaining pawl which is retained in said retaining hole so that the fuel-supply-related mechanism is secured to the rotary tank.

7. A fuel tank cap body structure as claimed in claim 6, wherein a cutaway window is formed in a part of said fuel-supply-related mounting wall and a gage mounting portion extending from said flange is formed in said cutaway window.

8. A fuel tank cap body structure as claimed in claim 6, wherein said fuel-supply-related mechanism is contained in a closed-end container; said structure further comprising engaging means with which a front end of said fuel-supply-related mechanism mounting wall is engaged on a wall surface of the closed-end container and a cutaway window is formed in said fuel-supply-related mechanism mounting wall.

9. A fuel tank cap body structure as claimed in either claim 6 or claim 7, wherein a gage-connecting connector is disposed in such a way as to face said cutaway window.

10. A fuel tank cap body structure as claimed in claim 8, wherein said cutaway window is closed when said gage is mounted in said cutaway window.

11. A fuel tank cap body structure as claimed in claim 6, wherein the fuel tank cap body further comprises a flange and a rigidity of the flange is increased by reinforcing ribs.

12. A fuel tank cap body structure as claimed in claim 6, wherein a rigidity of said fuel-supply-related mechanism mounting wall is increased by reinforcing ribs; said fuel-supply-related mechanism including an elastic engaging portion which is provided on a periphery of said fuel-supply-related mechanism.

13. A fuel tank cap body unit comprising:
a filter-equipped pump including:
a fuel pump portion, and
a fuel filter portion, integrally provided with said fuel pump portion, wherein said filter-equipped pump has a backing member;
a rotary tank, having a flat base so that a base of a fuel tank is brought into contact with said rotary tank, the rotary tank defining a plurality of slits,
wherein said filter-equipped pump is fixedly contained in said rotary tank to integrate said rotary tank with said filter-equipped pump, and
a recessed line axially extending from said base of said rotary tank wherein said backing member of said filter-equipped pump receives said recessed line in order to constitute a stopper for regulating a fitting position of said filter-equipped pump with respect to said rotary tank;
a fuel tank cap body including:
a fuel discharge flow channel portion therethrough, and
a rotary tank mounting wall which accommodates at least said rotary tank and said filter-equipped pump, the rotary-tank mounting wall including a plurality of retaining pawls; and
a flexible mechanism formed by the plurality of retaining pawls and the plurality of slits, in which the plurality of retaining pawls is movably held by the plurality of slits,
wherein said rotary tank mounting wall provided for said rotary tank and fuel tank cap body is fitted such that said rotary tank mounting wall can be made flexibly movable via said flexible mechanism.

14. The fuel tank cap body unit as claimed in claim 13, wherein the rotary tank has a side surface partly cut to define two edges in an axial direction between which the filter-equipped pump is inserted, and wherein the plurality of slits are formed near the two edges of the side surface of the rotary tank.

15. The fuel tank cap body unit as claimed in claim 14, wherein the plurality of slits extend in an axial direction.

16. A fuel tank cap body unit comprising:
a filter-equipped pump including:
a fuel pump portion, and
a fuel filter portion, integrally provided with said fuel pump portion;
a rotary tank, having a flat base so that a base of a fuel tank is brought into contact with said rotary tank, the rotary tank defining a plurality of slits,
wherein said rotary tank has a side surface including a retaining hole, and wherein said filter-equipped pump has a periphery which includes a retaining pawl which is retained in said retaining hole so that the filter-equipped pump is secured to the rotary tank, and
a fuel tank cap body having a rotary-tank mounting wall extending in a downward direction, which accommodates at least said rotary tank and said filter-equipped pump.

* * * * *